US012662631B2

(12) United States Patent
Pan et al.

(10) Patent No.: US 12,662,631 B2
(45) Date of Patent: Jun. 23, 2026

(54) LIQUID CRYSTAL COMPOSITION AND LIQUID DISPLAY DEVICE

(71) Applicant: Jiangsu Hecheng Display Technology Co., Ltd., Nanjing (CN)

(72) Inventors: Dike Pan, Nanjing (CN); Wenquan Ding, Nanjing (CN); Di He, Nanjing (CN); Lifang Yao, Nanjing (CN); Fei Zhao, Nanjing (CN); Panpan Wang, Nanjing (CN); Huijuan Dai, Nanjing (CN)

(73) Assignee: Jiangsu Hecheng Display Technology Co., Ltd., Nanjing (CN)

( * ) Notice: Subject to any disclaimer, the term of this patent is extended or adjusted under 35 U.S.C. 154(b) by 0 days.

(21) Appl. No.: 19/136,103

(22) PCT Filed: Nov. 7, 2023

(86) PCT No.: PCT/CN2023/130201

§ 371 (c)(1),
(2) Date: Jun. 5, 2025

(87) PCT Pub. No.: WO2024/120103

PCT Pub. Date: Jun. 13, 2024

(65) Prior Publication Data

US 2026/0002077 A1 Jan. 1, 2026

(30) Foreign Application Priority Data

Dec. 9, 2022 (CN) ........................ 202211588808.7

(51) Int. Cl.
*C09K 19/34* (2006.01)

(52) U.S. Cl.
CPC ...... *C09K 19/3491* (2013.01); *C09K 19/3405* (2013.01); *C09K 19/3494* (2013.01); *C09K 2019/3408* (2013.01)

(58) Field of Classification Search
CPC ...................................................... C09K 19/34
See application file for complete search history.

(56) References Cited

U.S. PATENT DOCUMENTS

| | | | | |
|---|---|---|---|---|
| 2019/0093013 | A1* | 3/2019 | Manabe | G02F 1/137 |
| 2020/0032143 | A1 | 1/2020 | Takaka | |
| 2022/0002623 | A1 | 1/2022 | Yao et al. | |
| 2023/0257654 | A1 | 8/2023 | He et al. | |

FOREIGN PATENT DOCUMENTS

| | | | |
|---|---|---|---|
| CN | 110300746 | A | 10/2019 |
| CN | 110396411 | A | 11/2019 |
| CN | 113072953 | A | 7/2021 |
| CN | 113845920 | A | 12/2021 |
| CN | 113845924 | A | 12/2021 |
| CN | 114479879 | A | 5/2022 |
| CN | 114525140 | A | 5/2022 |
| CN | 115247069 | A | 10/2022 |
| TW | 202200757 | A | 1/2022 |
| TW | 202200762 | A | 1/2022 |
| WO | WO 2019/107394 | A1 | 6/2019 |

OTHER PUBLICATIONS

PCT Search Report dated Feb. 7, 2024.
PCT Search Report—English Translation.
PCT Written Opinion dated Feb. 7, 2024.
PCT Written Opinion—English Machine Translation.

* cited by examiner

*Primary Examiner* — Chanceity N Robinson
(74) *Attorney, Agent, or Firm* — Hoffmann & Baron, LLP

(57) ABSTRACT

A liquid crystal composition includes at least one compound of general formula I, at least one compound of general formula II and at least one compound of general formula III. The liquid crystal composition has a suitable optical anisotropy, a suitable clearing point, a suitable dielectric anisotropy absolute value, a large K value, a low rotational viscosity, a short response time, a high transmittance, a high contrast and a long low-temperature storage time. A liquid crystal display device having the liquid crystal composition has excellent performance and is suitable for fast response, high-contrast VA, IPS, NFFS and other display modes.

17 Claims, No Drawings

LIQUID CRYSTAL COMPOSITION AND LIQUID DISPLAY DEVICE

CROSS-REFERENCE TO RELATED APPLICATIONS

This application is the National Stage of International Application No. PCT/CN2023/130201, filed Nov. 7, 2023, which claims the benefit of Chinese Application No. 202211588808.7, filed Dec. 9, 2022, the contents of which is incorporated by reference herein.

TECHNICAL FIELD

The present invention belongs to the technical field of liquid crystal materials, specifically relates to a liquid crystal display device, and further specifically relates to a liquid crystal composition comprising an olefinic benzothiopheneyl based compound, as well as a liquid crystal display device.

BACKGROUND ARTS

For its small size, light weight, low power consumption and excellent display quality, liquid crystal display (LCD) has achieved a rapid development, and especially a wide application in portable electronic information products. With the increase in the size of the liquid crystal screens for portable computers, office applications, video applications, the liquid crystal display can be used for large-screen displays and eventually replace the cathode ray tube (CRT) display.

Compared with traditional display devices and display materials, liquid crystal display materials have obvious advantages: low driving voltage, small power consumption, high reliability, large amount of display information, color display, no flicker, no harm to the human body, automatic production process, low cost, ability of being made into liquid crystal displays of various specifications and types, easy to be carried and so on. Because of these advantages, liquid crystal display technology has had a profound impact on the field of imaging display, and promoted the development of microelectronics technology and optoelectronic information technology. Liquid crystal materials have been widely used in many display occasions due to the good optical properties and photoelectric effects thereof. Therefore, the research on liquid crystal materials is getting deeper and deeper.

With the wide application of TFT-type LCDs, the requirements on the performance thereof constantly increase. High image display quality requires those having a faster response speed, a lower energy consumption, and higher low-temperature reliability, in addition to higher contrast rate and transmittance, especially for the IPS-type liquid crystal display mode. This means that liquid crystal materials need to have higher contrast rate and transmittance, higher elasticity constants, higher dielectric constants and low-temperature reliability, and the increase of these properties needs improvements of liquid crystal materials.

According to the equation of the transmittance for IPS mode $T \propto |\Delta\varepsilon|/\varepsilon_\perp$ (T represents transmittance, "∝" represents the "inverse proportion" relationship, and $\varepsilon_\perp$ represents the dielectric constant perpendicular to the direction of the molecular axis). If an improvement of the transmittance of the liquid crystal is wanted, it might attempte to decrease the $\Delta\varepsilon$ of liquid crystal medium. But in general, the adjustment range for the drive voltage of the same product is limited. In addition, the liquid crystal molecules will tilt towards the Z axis under the action of the vertical component of the edge electric field, resulting in the change of its optical anisotropy. According to the equation $$T = \sin^2(2\chi)\sin^2\left(\frac{\pi\Delta nd}{\lambda}\right)$$

(wherein, $\chi$ is the angle between the optical axis of the liquid crystal layer and the optical axis of the polarizer, $\Delta n$ is the optical anisotropy, d is the cell gap, and $\lambda$ is the wavelength), it can be seen that effective $\Delta n^*d$ will affect T. If an improvement of the transmittance of the positive liquid crystal is wanted, increasing $\Delta n^*d$ can be taken into consideration, but the retardation amount for each product is designed to be fixed.

In another aspect, based on the light leakage performance test of traditional IPS-LCD, the main causes of the light leakage issues of liquid crystal display device are as follows: LC scattering, rubbing uniformity, CF/TFT scattering, and polarize ability, wherein, LC scattering accounts for 63% of the factors affecting light leakage performance.

According to the following equation: LC Scattering $$\propto \frac{d \cdot \Delta n^2 \cdot (n_e + n_o)^2}{K_{ave}},$$

wherein, d represents the cell gap of the liquid crystal cell, $n_e$ represents the refractive index of extraordinary light, $n_o$ represents the refractive index of ordinary light.

In order to increase the LC scattering of the liquid crystal materials, increasing average elastic constant $K_{ave}$ (wherein, $K_{ave}=(K_{11}+K_{22}+K_{33})/3$) is needed to improve the LC scattering. In the situation of increasing the $K_{ave}$, the light leakage of the liquid crystal material can be decreased.

In addition, the relationship between the contrast rate (CR) and the luminance (L) is as follows:

$$CR = L_{255}/L_0 \times 100\%,$$

wherein, $L_{255}$ is the on-state luminance, and $L_0$ is the off-state luminance. It can be seen that CR is significantly affected by the change of $L_0$. In the off state, $L_0$ has nothing to do with the dielectric performance of the liquid crystal molecule, but is related to the LC Scattering of the liquid crystal material itself. The smaller the LC Scattering, the smaller the $L_0$, and the CR is thereby significantly increased.

In view of the above, common methods for improving the contrast rate and transmittance may be considered from the following two aspects: (1) keeping the dielectric anisotropy $\Delta\varepsilon$ of the liquid crystal composition unchanged, the transmittance may be effectively improved by increasing $\varepsilon_\perp$; (2) increasing the value of the average elastic constant $K_{ave}$ of a liquid crystal composition, such that the liquid crystal molecules become more organized, and have less light leakage, thereby improving the transmittance. However, the $\varepsilon_\perp/\Delta\varepsilon$ ratio of the liquid crystal composition provided in the prior art is lower and $K_{ave}$ is lower, causing an insufficient transmittance, a slow response and a poor low-temperature storage performance. Therefore, how to provide a liquid crystal composition that can solve the above problems is still an urgent technical problem to be solved in this field.

SUMMARY OF THE INVENTION

Regarding the disadvantages in the prior art, it is an object of the present invention to provide a liquid crystal composition and a liquid crystal display device. Via designing the specific constitution of the liquid crystal composition, and further using the compound of general formula I containing cycloalkenyl groups in conjunction with the compound of general formula II and the compound of general formula III, the liquid crystal composition prepared in the present invention has an appropriate optical anisotropy, an appropriate clearing point, an appropriate absolute value of dielectric anisotropy, a larger K value, a smaller rotational viscosity, a shorter response time, a higher transmittance, a higher contrast rate and a longer low-temperature storage time, which makes the liquid crystal display device containing the liquid crystal composition of the present invention have a wider using temperature range, a lower threshold voltage, a better contrast rate, a faster response speed, a faster refresh speed and a higher transmittance, and suitable for fast-response, high-contrast VA, IPS, NFFS display modes and the like.

To realize this object, the present invention adopts the following technical solutions:

In a first aspect, the present application provides a liquid crystal composition comprising at least one compound of general formula I, at least one compound of general formula II and at least one compound of general formula III:

I

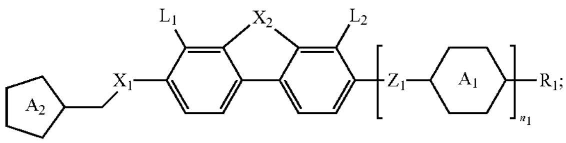

II

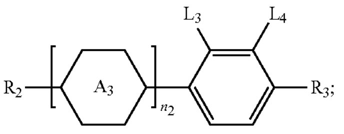

III

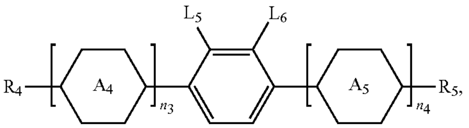

wherein, $R_1$ represents —H, $C_{1-12}$ (for example, it can be $C_1$, $C_2$, $C_3$, $C_4$, $C_5$, $C_6$, $C_7$, $C_8$, $C_9$, $C_{10}$, $C_{11}$ or $C_{12}$) halogenated or unhalogenated linear alkyl, $C_{3-12}$ (for example, it can be $C_3$, $C_4$, $C_5$, $C_6$, $C_7$, $C_8$, $C_9$, $C_{10}$, $C_{11}$ or $C_{12}$) halogenated or unhalogenated branched alkyl, $C_{1-12}$ (for example, it can be $C_1$, $C_2$, $C_3$, $C_4$, $C_5$, $C_6$, $C_7$, $C_8$, $C_9$, $C_{10}$, $C_{11}$ or $C_{12}$) halogenated or unhalogenated alkoxy, $C_{2-12}$ (for example, it can be $C_2$, $C_3$, $C_4$, $C_5$, $C_6$, $C_7$, $C_8$, $C_9$, $C_{10}$, $C_{11}$ or $C_{12}$) halogenated or unhalogenated alkenyl, $C_{2-12}$ (for example, it can be $C_2$, $C_3$, $C_4$, $C_5$, $C_6$, $C_7$, $C_8$, $C_9$, $C_{10}$, $C_{11}$ or $C_{12}$) halogenated or unhalogenated alkenoxy,

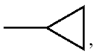, 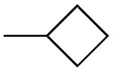 or 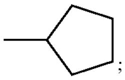;

$R_2$~$R_5$ each independently represents $C_{1-12}$ (for example, it can be $C_1$, $C_2$, $C_3$, $C_4$, $C_5$, $C_6$, $C_7$, $C_8$, $C_9$, $C_{10}$, $C_{11}$ or $C_{12}$) linear alkyl, $C_{3-12}$ (for example, it can be $C_3$, $C_4$, $C_5$, $C_6$, $C_7$, $C_8$, $C_9$, $C_{10}$, $C_{11}$ or $C_{12}$) branched alkyl, $C_{1-12}$ (for example, it can be $C_1$, $C_2$, $C_3$, $C_4$, $C_5$, $C_6$, $C_7$, $C_8$, $C_9$, $C_{10}$, $C_{11}$ or $C_{12}$) alkoxy, $C_{2-12}$ (for example, it can be $C_2$, $C_3$, $C_4$, $C_5$, $C_6$, $C_7$, $C_8$, $C_9$, $C_{10}$, $C_{11}$ or $C_{12}$) alkenyl, $C_{2-12}$ (for example, it can be $C_2$, $C_3$, $C_4$, $C_5$, $C_6$, $C_7$, $C_8$, $C_9$, $C_{10}$, $C_{11}$ or $C_{12}$) alkenoxy,

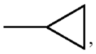, 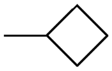 or 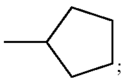; ring

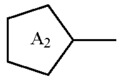 represents 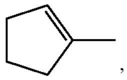, 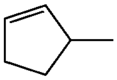 or

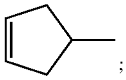; ring 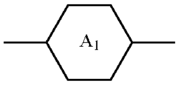 represents

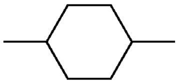, 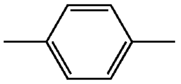 or

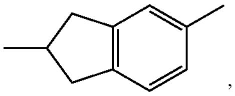, wherein one or at least two —$CH_2$— in

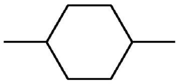 and 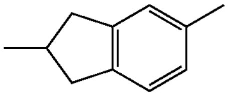

can be replaced by —O—, one or at least two single bond in the rings can be replaced by double bond; one or at least two —H on

 and 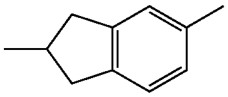

and can each be independently replaced by —F, —Cl, —CN, —$CH_3$ or —$OCH_3$, one or at least two —CH= in the rings can be replaced by —N=;

ring

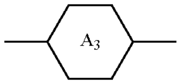 represents 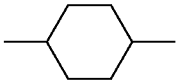, one or at least two —$CH_2$— in

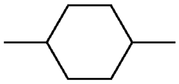

can be replaced by —O—, one or at least two single bond in the rings can be replaced by double bond, and one or at least two single bond in at least one ring

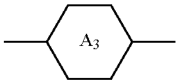

is replaced by double bond;

ring

and ring

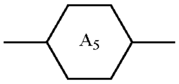

each independently represents

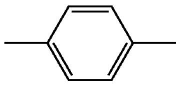

, one or at least two —H on

can each be independently replaced by —F, —Cl, —CN, —$CH_3$ or —$OCH_3$, one or at least two —CH= in the rings can be replaced by —N=;

$L_1$-$L_6$ each independently represents halogen atom;

$X_1$ and $X_2$ each independently represents —O— or —S—;

$Z_1$ represents single bond, —CO—O—, —O—CO—, —$CH_2O$—, —$OCH_2$—, —CH=CH—, —C≡C—, —$CH_2CH_2$—, —$CF_2CF_2$—, —$(CH_2)_4$—, —$CF_2O$— or —$OCF_2$—;

$n_1$ represents 0, 1 or 2, when $n_1$ represents 2, ring

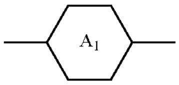

can be the same or different, $Z_1$ can be the same or different;

$n_2$ represents 1 or 2, when $n_2$ represents 2, ring

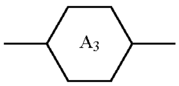

can be the same or different; and $n_3$ represents 0, 1, 2 or 3, $n_4$ represents 0 or 1, and $2 \le n_3+n_4 \le 3$; when $n_3$ represents 2 or 3, ring

can be the same or different.

Negative liquid crystal monomer compound containing cycloalkenyl groups is a type of relatively new liquid crystal monomer materials in recent years. Compared with conventional negative monomers, negative monomers with cycloalkenyl groups have the advantages of good mutual solubility in liquid crystal mixtures, fast response, large K value and so on, and usually have moderate refractive index and clearing point, which have good effects in both positive and negative liquid crystal materials.

Via using negative compound containing cycloalkenyl groups (the compound of general formula I) in conjunction with the compound of general formula II and/or the compound of general formula III, the liquid crystal composition prepared in the present invention has an appropriate optical anisotropy, an appropriate clearing point, an appropriate absolute value of dielectric anisotropy, a larger K value ($K_{11}$, $K_{33}$), a smaller rotational viscosity, a shorter response time, a higher transmittance, a higher contrast rate and a longer low-temperature storage time as well as excellent mutual solubility, which makes the liquid crystal display device containing the liquid crystal composition of the present invention have a wider using temperature range, a lower threshold voltage, a better contrast rate, a faster response speed, a faster refresh speed and a higher transmittance and suitable for fast-response VA, IPS, NFFS display modes and the like.

In the present invention, the halogen atom includes fluorine atom, chlorine atom, bromine atom and iodine atom (the same below).

The followings are preferred technical solutions of the present invention, but not used as limitations of the technical solutions provided by the present invention. The objections and beneficial effects of the present invention can be better achieved and realized via the following preferred technical solutions.

In some embodiments of the present invention, the compound of general formula I is any one or the combination of at least two of the compounds with the following structures:

I-1

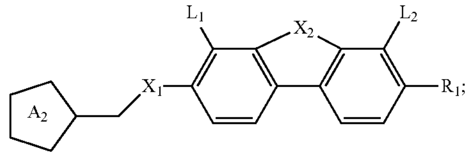

I-2

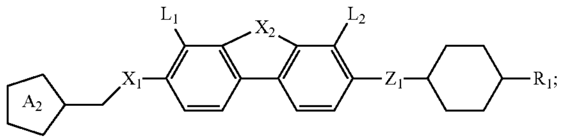

-continued

I-3

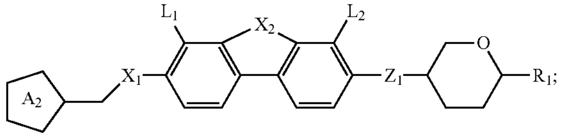

I-4

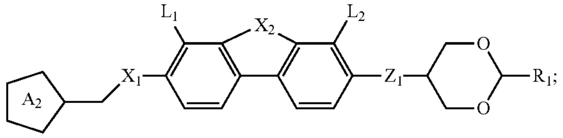

I-5

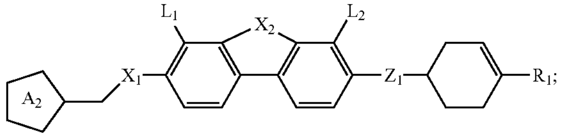

I-6

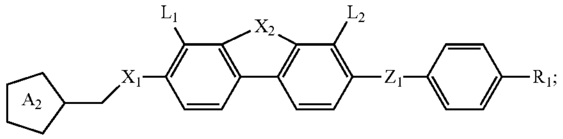

I-7

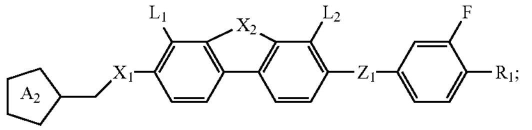

and

I-8

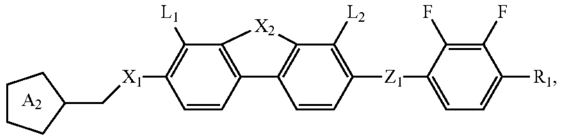

wherein, ring

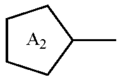

, $R_1$, $X_1$, $X_2$, $L_1$, $L_2$, and $Z_1$ have the same protection scopes as aforesaid.

In some embodiments of the present invention, ring

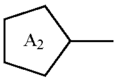

represents

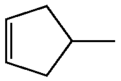

.

In some embodiments of the present invention, $L_1$ and $L_2$ represent fluorine atom.

In some embodiments of the present invention, the compound of general formula I is the compound I-1.

In some embodiments of the present invention, the liquid crystal composition comprises at least two compounds of general formula I.

In some embodiments of the present invention, in the liquid crystal composition, percentage by weight of the compound of general formula I is 0.1%-30%, for example, it can be 0.1%, 0.2%, 0.5%, 1%, 2%, 4%, 6%, 8%, 10%, 12%, 14%, 16%, 18%, 20%, 22%, 24%, 26%, 28%, 30% or the like, further preferably, 1%-20%, still further preferably, 4%-16%.

In some embodiments of the present invention, it is preferred to adjust the content of the compound of general formula I, such that the liquid crystal composition comprising the same has an appropriate optical anisotropy, an appropriate clearing point, an appropriate absolute value of dielectric anisotropy, a larger K value ($K_{11}$, $K_{33}$), a smaller rotational viscosity, a shorter response time, a higher transmittance, a higher contrast rate and a longer low-temperature storage time.

In some embodiments of the present invention, the compound of general formula II is any one or the combination of at least two of the compounds with the following structures:

II-1

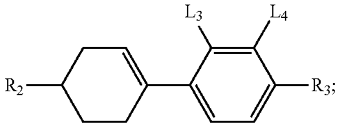

ii-2

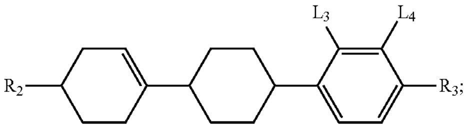

II-3

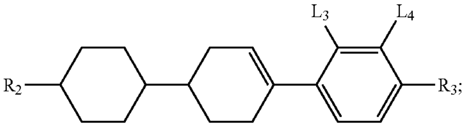

II-4

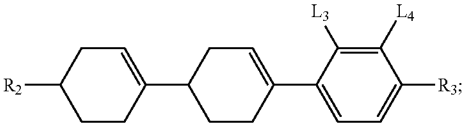

II-5

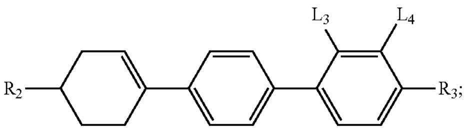

and

II-6

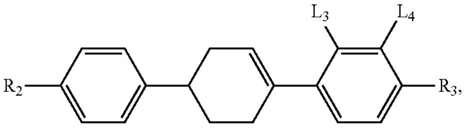

wherein, $R_2$, $R_3$, $L_3$, and $L_4$ have the same protection scopes as aforesaid.

In some embodiments of the present invention, $L_3$ and $L_4$ both represent fluorine atom.

In some embodiments of the present invention, the liquid crystal composition comprises at least two (for example, it can be three or four) compounds of general formula II.

In some embodiments of the present invention, in the liquid crystal composition, percentage by weight of the compound of general formula II is 0.1%-50%, for example, it can be 0.1%, 0.2%, 0.5%, 1%, 2%, 5%0, 10%, 15%, 20%, 25%, 30%, 36%, 40%, 45%, 50% or the like, further preferably, 15%-36%.

In some embodiments of the present invention, it is preferred to adjust the content of the compound of general formula II such that the liquid crystal composition comprising the same has an appropriate optical anisotropy, an appropriate clearing point, an appropriate absolute value of dielectric anisotropy, a larger K value ($K_{11}$, $K_{33}$), a smaller rotational viscosity, a shorter response time, a higher transmittance, a higher contrast rate and a longer low-temperature storage time.

In some embodiments of the present invention, the compound of general formula III is any one or the combination of at least two of the compounds with the following structures:

III-1

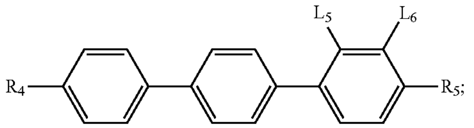

III-2

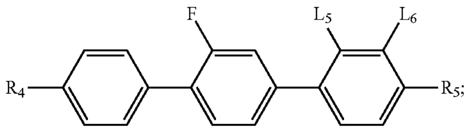

III-3

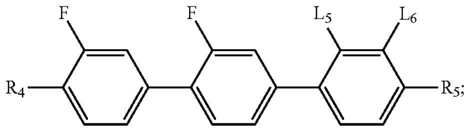

III-4

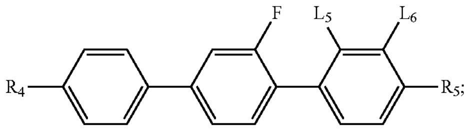

III-5

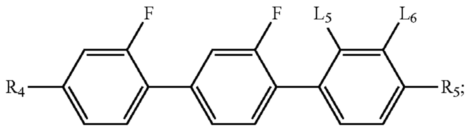

III-6

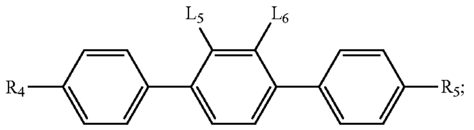

III-7

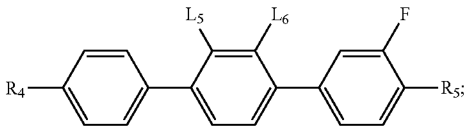

III-8

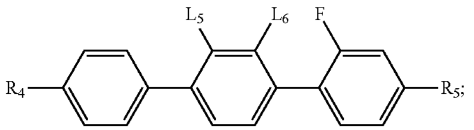

-continued

III-9

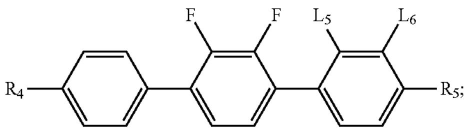

III-10

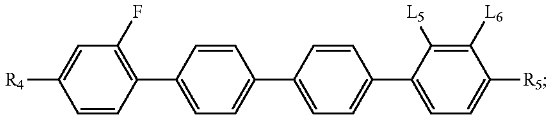

III-11

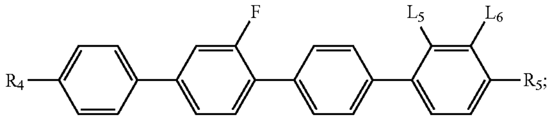

III-12

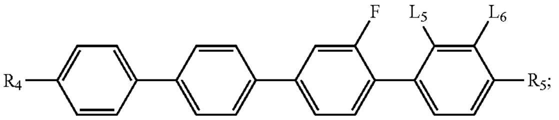

III-13

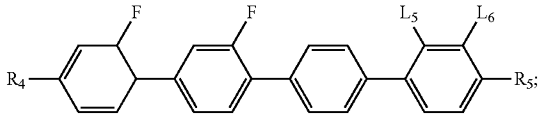

III-14

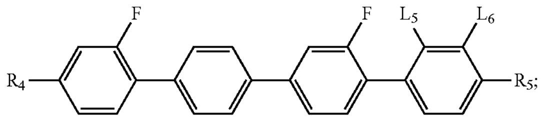

III-15

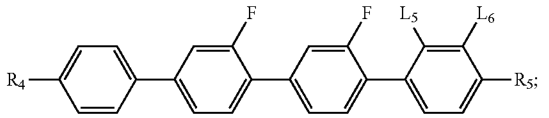

III-16

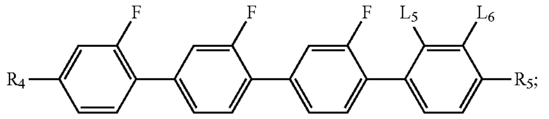

III-17

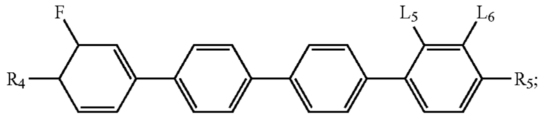

III-18

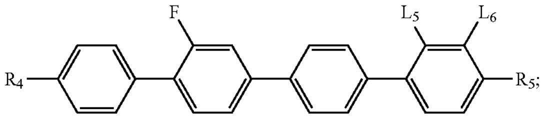

III-19

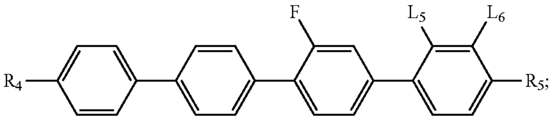

-continued

III-20

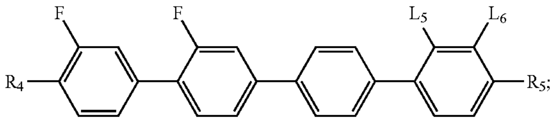

III-21

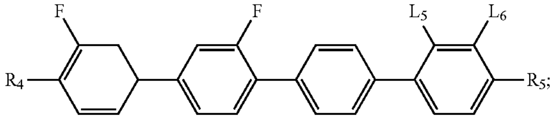

III-22

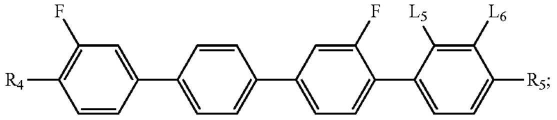

III-23

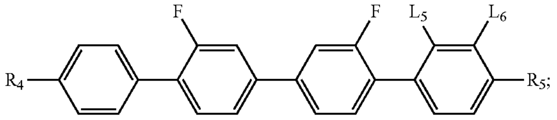

III-24

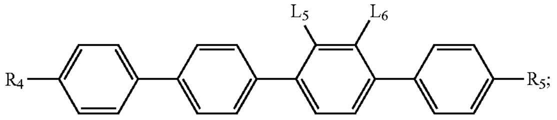

III-25

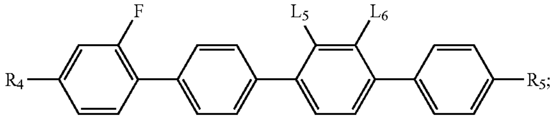

III-26

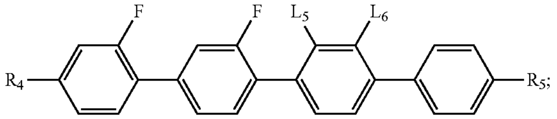

III-27

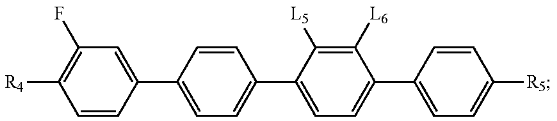

III-28

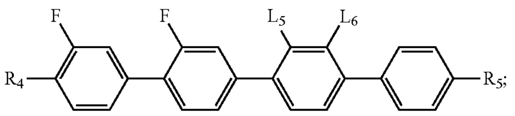

and

III-29

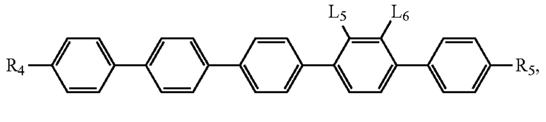

wherein, $R_4$, $R_5$, $L_5$, and $L_6$ have the same protection scopes as aforesaid;

in some embodiments of the present invention, $L_5$ and $L_6$ both represent fluorine atom.

In some embodiments of the present invention, the liquid crystal composition comprises at least two (for example, it can be three or four) compounds of general formula III.

In some embodiments of the present invention, the liquid crystal composition comprises at least one (for example, it can be two or three) compounds of general formula III of which $R_4$ represents $C_{2-12}$ (for example, it can be $C_2$, $C_3$, $C_4$, $C_5$, $C_6$, $C_7$, $C_8$, $C_9$, $C_{10}$, $C_{11}$ or $C_{12}$) alkenyl.

In some embodiments of the present invention, in the liquid crystal composition, percentage by weight of the compound of general formula III is 0.1%-30%, for example, it can be 0.1%, 0.2%, 0.5%, 1%, 3%, 5%, 7%, 10%, 12%, 15%, 18%, 20%, 23%, 25%, 27%, 30% or the like, further preferably, 3%-15%.

In some embodiments of the present invention, it is preferred to adjust the content of the compound of general formula III such that the liquid crystal composition comprising the same has an appropriate optical anisotropy, an appropriate clearing point, an appropriate absolute value of dielectric anisotropy, a larger K value ($K_{11}$, $K_{33}$), a smaller rotational viscosity, a shorter response time, a higher transmittance, a higher contrast rate and a longer low-temperature storage time.

In some embodiments of the present invention, the liquid crystal composition further comprises at least one compound of general formula N:

N

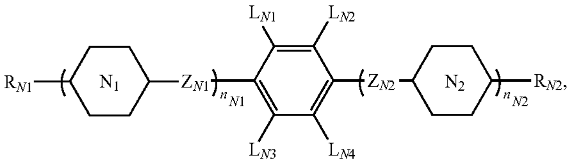

wherein, $R_{N1}$ and $R_{N2}$ each independently represents $C_{1-12}$ (for example, it can be $C_1$, $C_2$, $C_3$, $C_4$, $C_5$, $C_6$, $C_7$, $C_8$, $C_9$, $C_{10}$, $C_{11}$ or $C_{12}$) linear alkyl, $C_{3-12}$ (for example, it can be $C_3$, $C_4$, $C_5$, $C_6$, $C_7$, $C_8$, $C_9$, $C_{10}$, $C_{11}$ or $C_{12}$) branched alkyl,

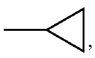, 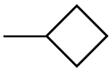 or 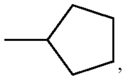, wherein one or at least two nonadjacent —$CH_2$— in the $C_{1-12}$ linear alkyl and $C_{3-12}$ branched alkyl can each be independently replaced by —CH═CH—, —C≡C—, —O—, —CO—, —CO—O— or —O—CO—;

ring

 and ring 

each independently represents

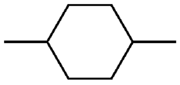 or 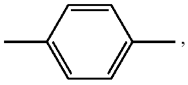, wherein one or at least two $—CH_2—$ in

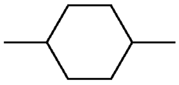

can be replaced by —O—; one or at least two —H on

can each be independently replaced by —F, —Cl or —CN, one or at least two —CH═ in the rings can be replaced by —N═;

$Z_{N1}$ and $Z_{N2}$ each independently represents single bond, —CO—O—, —O—CO—, $—CH_2O—$, $—OCH_2—$, —CH═CH—, —C≡C—, $—CH_2CH_2—$, $—CF_2CF_2—$, $—(CH_2)_4—$, $—CF_2O—$ or $—OCF_2—$;

$L_{N1}$ and $L_{N2}$ each independently represents —H, $C_{1-3}$ alkyl, or halogen atom;

$n_{N1}$ represents 0, 1, 2 or 3, $n_{N2}$ represents 0 or 1, and $0 \le n_{N1}+n_{N2} \le 3$, wherein when $n_{N1}$ represents 2 or 3, ring

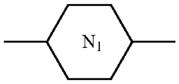

can be the same or different, and $Z_{N1}$ can be the same or different; and substituted or unsubstituted terphenyl structure is not contained in the compound of general formula N, the substituent for substitution is selected from —F, —Cl or —CN.

In some embodiments of the present invention, the compound of general formula N is any one or the combination of at least two of the compounds with the following structures:

N-1

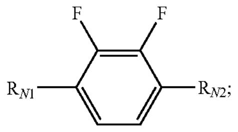

N-2

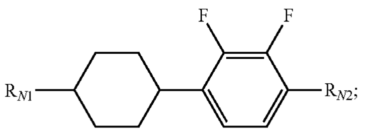

N-3

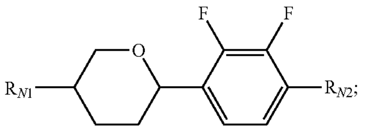

N-4

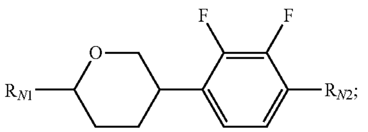

-continued

N-5

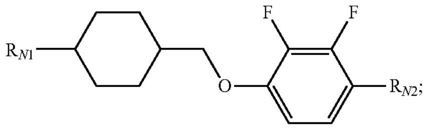

N-6

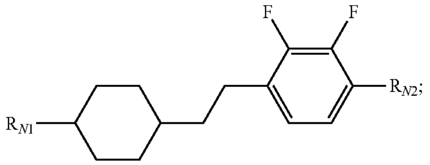

N-7

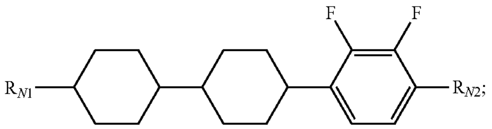

N-8

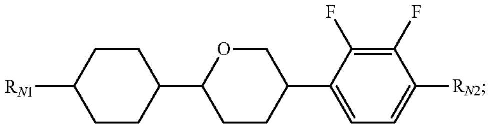

N-9

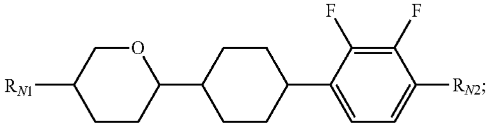

N-10

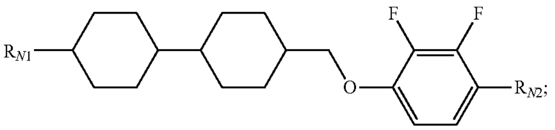

N-11

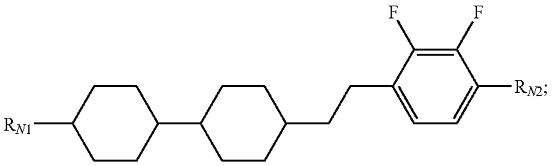

N-12

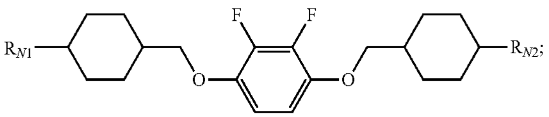

N-13

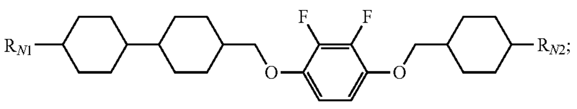

N-14

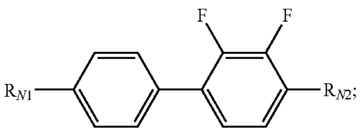

-continued

N-15

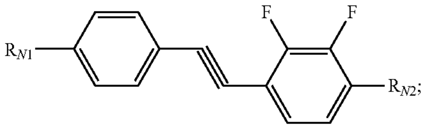

N-16

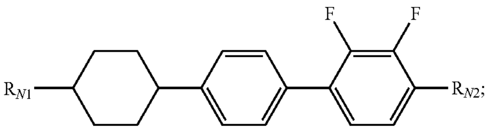

N-17

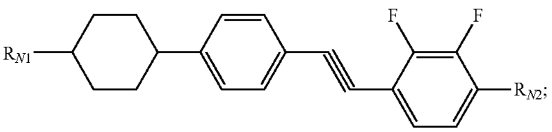

N-18

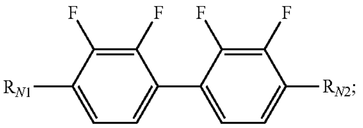

N-19

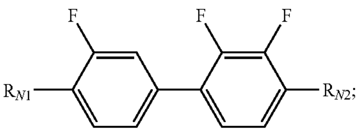

N-20

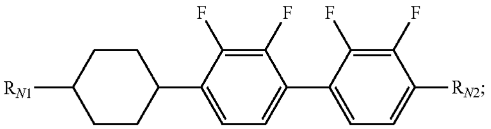

N-21

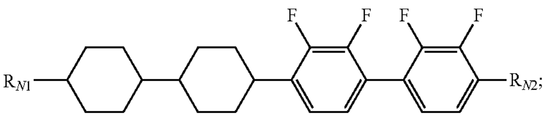

N-22

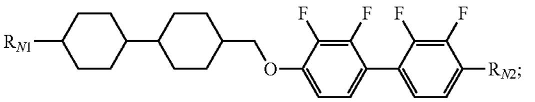

and

N-23

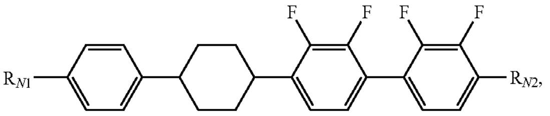

wherein, $R_{N1}$ and $R_{N2}$ have the same protection scopes as aforesaid.

In some embodiments of the present invention, the compound of general formula N is selected from a group consisting of the compound of general formula N-2, the compound of general formula N-5, the compound of general formula N-10, the compound of general formula N-14, the compound of general formula N-16, and the compound of general formula N-19. In some embodiments of the present invention, in the liquid crystal composition, percentage by weight of the compound of general formula N is 0.1%-30%, for example, it can be 0.1%, 0.2%, 0.5%, 1%, 2%, 5%, 7%, 10%, 12%, 15%, 18%, 20%, 23%, 25%, 27%, 30% or the like, further preferably, 5%-25%.

In some embodiments of the present invention, it is preferred to adjust the content of the compound of general formula N such that the liquid crystal composition comprising the same has an appropriate optical anisotropy, an appropriate clearing point, an appropriate absolute value of dielectric anisotropy, a larger K value ($K_{11}$, $K_{33}$), a smaller rotational viscosity, a shorter response time, a higher transmittance, a higher contrast rate and a longer low-temperature storage time.

In some embodiments of the present invention, the liquid crystal composition further comprises at least one compound of general formula M:

M

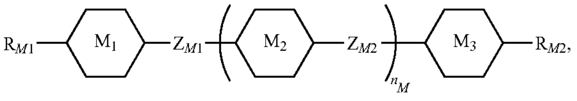

wherein, $R_{M1}$ and $R_{M2}$ each independently represents $C_{1-12}$ (for example, it can be $C_1$, $C_2$, $C_3$, $C_4$, $C_5$, $C_6$, $C_7$, $C_8$, $C_9$, $C_{10}$, $C_{11}$ or $C_{12}$) linear alkyl, $C_{3-12}$ (for example, it can be $C_3$, $C_4$, $C_5$, $C_6$, $C_7$, $C_8$, $C_9$, $C_{10}$, $C_{11}$ or $C_{12}$) branched alkyl,

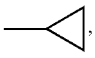, 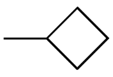 or 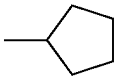, wherein one or at least two nonadjacent $—CH_2—$ in the $C_{1-12}$ linear alkyl and $C_{3-12}$ branched alkyl can each be independently replaced by —CH═CH—, —C≡C—, —O—, —CO—, —CO—O— or —O—CO—;

ring

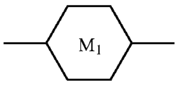, ring 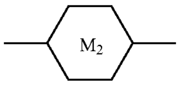 and ring 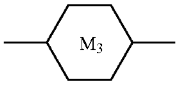

each independently represents

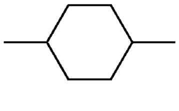 or 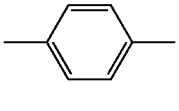, wherein one or at least two $—CH_2—$ in

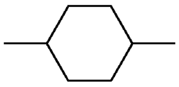

can be replaced by —O—, one or at least two single bond in the rings can be replaced by double bond; at most one —H on

can be replaced by halogen atom;

$Z_{M1}$ and $Z_{M2}$ each independently represents single bond, —CO—O—, —O—CO—, —$CH_2O$—, —$OCH_2$—, —C≡C—, —CH=CH—, —$CH_2CH_2$— or —$(CH_2)_4$—; and $n_M$ represents 0, 1 or 2, wherein when $n_M$ represents 2, ring

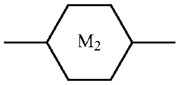

can be the same or different, $Z_{M2}$ can be the same or different.

In some embodiments of the present invention, the compound of general formula M is any one or the combination of at least two of the compounds with the following structures:

M-1

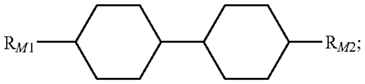

M-2

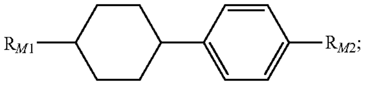

M-3

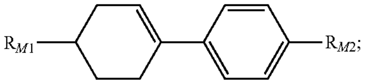

M-4

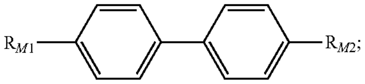

M-5

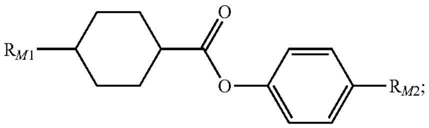

M-6

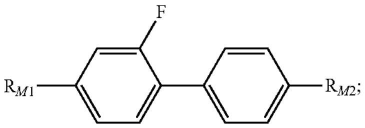

M-7

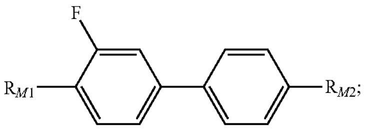

M-8

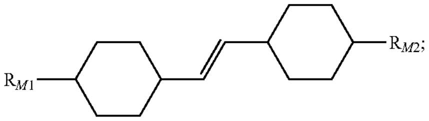

-continued

M-9

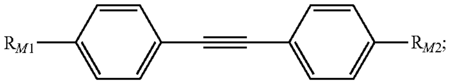

M-10

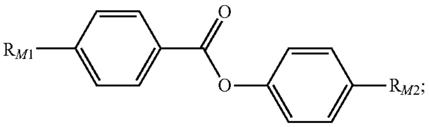

M-11

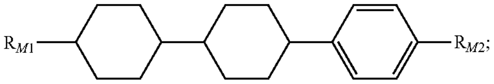

M-12

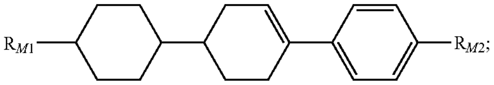

M-13

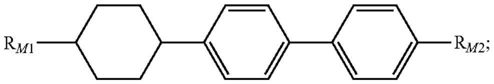

M-14

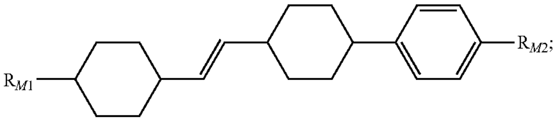

M-15

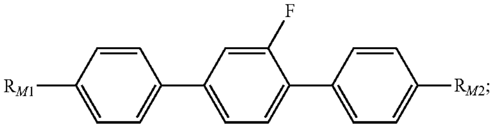

M-16

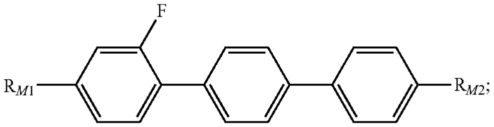

M-17

M-18

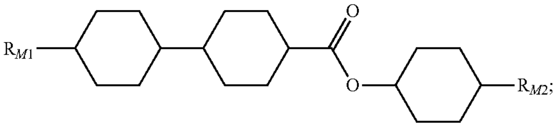

M-19

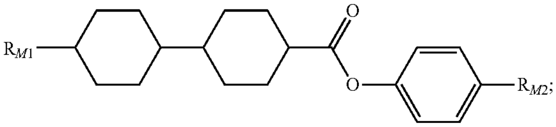

M-20

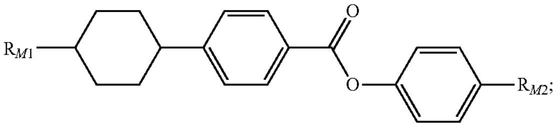

-continued

M-21

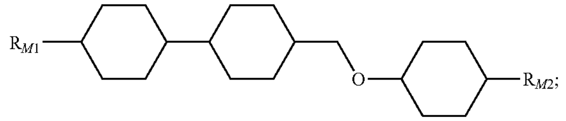

M-22

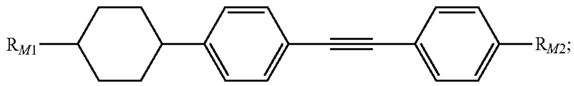

M-23

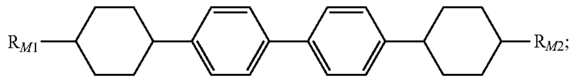

M-24

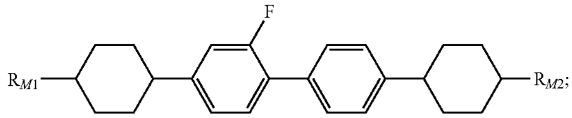

M-25

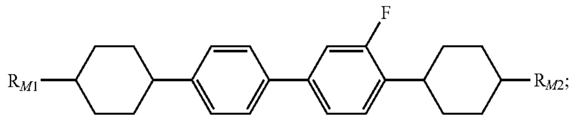

M-26

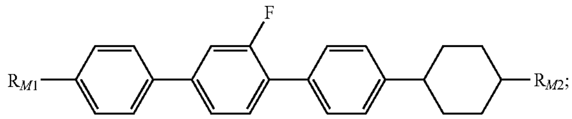

M-27

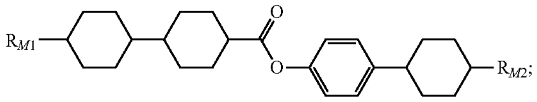 and

M-28

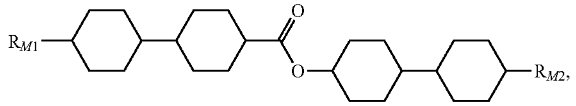

wherein, $R_{M1}$ and $R_{M2}$ have the same protection scopes as aforesaid.

In some embodiments of the present invention, the compound of general formula M is selected from a group consisting of the compound of general formula M-1, the compound of general formula M-2, the compound of general formula M-4, the compound of general formula M-13, the compound of general formula M-15, and the compound of general formula M-28.

In some embodiments of the present invention, in the liquid crystal composition, percentage by weight of the compound of general formula M is 0.1%-60%, for example, it can be 0.1%, 0.2%, 0.5%1, %, 2%, 5%, 10%, 15%, 20%, 25%, 30%, 35%, 40%, 45%, 50%, 55%, 60% or the like, further preferably, 30%-50%.

In some embodiments of the present invention, the liquid crystal composition further comprises at least one compound of general formula B:

B

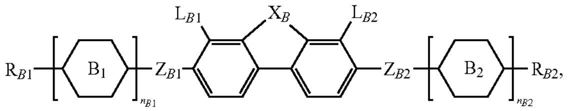

wherein, $R_{B1}$ and $R_{B2}$ each independently represents halogen atom, $C_{1-12}$ (for example, it can be $C_1$, $C_2$, $C_3$, $C_4$, $C_5$, $C_6$, $C_7$, $C_8$, $C_9$, $C_{10}$, $C_{11}$ or $C_{12}$) halogenated or unhalogenated linear alkyl, $C_{3-12}$ (for example, it can be $C_3$, $C_4$, $C_5$, $C_6$, $C_7$, $C_8$, $C_9$, $C_{10}$, $C_{11}$ or $C_{12}$) halogenated or unhalogenated branched alkyl,

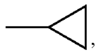, 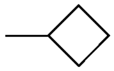 or 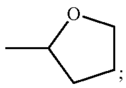;

wherein one or at least two nonadjacent —$CH_2$— in $C_{1-12}$ halogenated or unhalogenated linear alkyl, $C_{3-12}$ halogenated or unhalogenated branched alkyl,

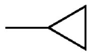 or 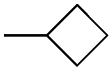

can each independently be replaced by —CH═CH—, —CH═CF—, —C≡C—, —O—, —CO—, —CO—O— or —O—CO—;

ring

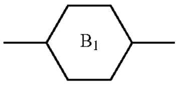 and ring 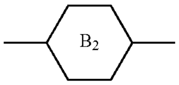

each independently represents

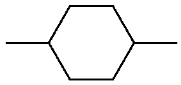,  or

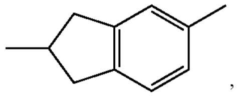, wherein one or at least two nonadjacent —$CH_2$— in

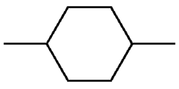 and 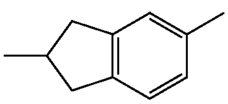

can be replaced by —O—, one or at least two single bond in the rings can be replaced by double bond; one or at least two —H on

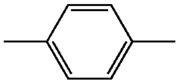

and

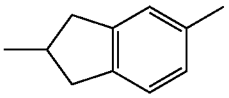

can each be independently replaced by —CN, —F or —Cl, one or at least two —CH═ in the rings can be replaced by —N═;

$X_B$ represents —O—, —S— or —CO—;

$L_{B1}$ and $L_{B2}$ each independently represents —H, —F, —Cl, —$CF_3$ or —$OCF_3$;

$Z_{B1}$ and $Z_{B2}$ each independently represents single bond, —CO—O—, —O—CO—, —$CH_2O$—, —$OCH_2$—, —CH═CH—, —C≡C—, —$CH_2CH_2$—, —$CF_2CF_2$—, —$(CH_2)n_{B4}$-, —$(CH_2)n_{B4}O$—, —$(CH_2)n_{B4}S$—, —$CF_2O$— or —$OCF_2$—, wherein $n_{B4}$ represents an integer of 0-5 (for example, it can be 0, 1, 2, 3, 4 or 5);

$n_{B1}$ and $n_{B2}$ each independently represents 0, 1 or 2, wherein when $n_{B1}$ represents 2, ring

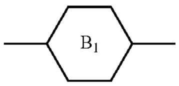

can be same or different, when $n_{B2}$ represents 2, ring

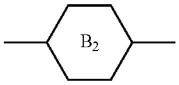

can be same or different, $Z_{B2}$ can be same or different.

In some embodiments of the present invention, the compound of general formula B is any one or the combination of at least two of the compounds with the following structures:

B-1

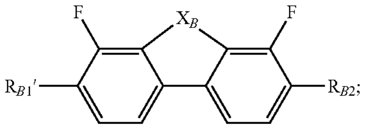

B-2

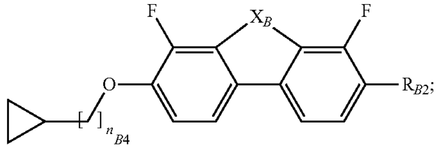

B-3

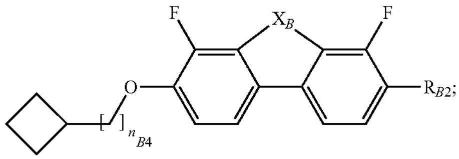

-continued

B-4

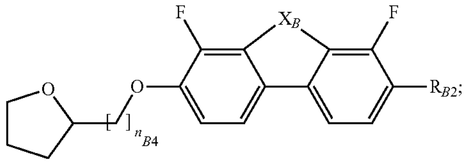

B-5

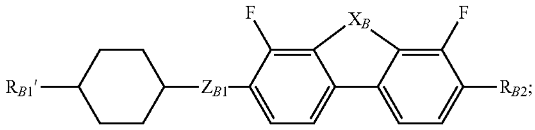

B-6

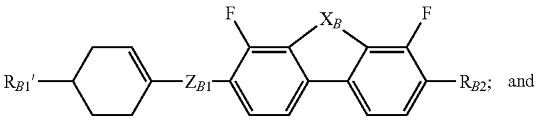

and

B-7

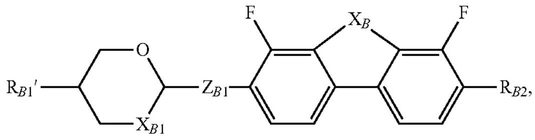

wherein, $R_{B1}'$ represents $C_{1-8}$ (for example, it can be $C_1$, $C_2$, $C_3$, $C_4$, $C_5$, $C_6$, $C_7$ or $C_8$) alkyl, $C_{1-8}$ (for example, it can be $C_1$, $C_2$, $C_3$, $C_4$, $C_5$, $C_6$, $C_7$ or $C_8$) alkoxy, $C_{2-8}$ (for example, it can be $C_2$, $C_3$, $C_4$, $C_5$, $C_6$, $C_7$ or $C_8$) alkenyl;

$X_{B1}$ represents —O— or —$CH_2$—;

$R_{B2}$, $X_B$ and $Z_{B1}$ have the same protection scopes as aforesaid.

In some embodiments of the present invention, the compound of general formula B-1 is any one or the combination of at least two of the compounds with the following structures:

B-1-1

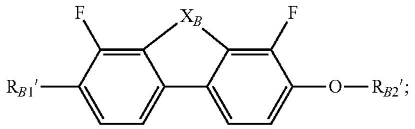

B-1-2

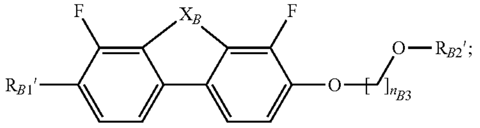

B-1-3

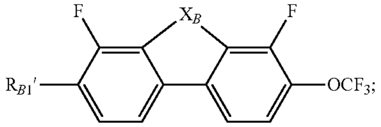

and

B-1-4

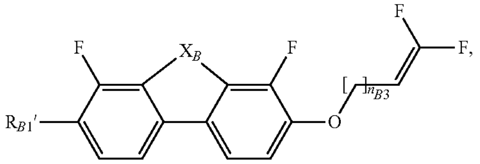

wherein, $R_{B2}'$ represents $C_{1-8}$ (for example, it can be $C_1$, $C_2$, $C_3$, $C_4$, $C_5$, $C_6$, $C_7$ or $C_8$) alkyl;

$R_{B1}'$, $X_B$ and $n_{B4}$ have the same protection scopes as aforesaid;

$n_{B3}$ represents 1, 2, 3 or 4;

$n_{B5}$ represents 0, 1, 2, 3 or 4.

In some embodiments of the present invention, in the liquid crystal composition, percentage by weight of the compound of general formula B is 0.1%-20%, for example, it can be 0.1%, 0.2%, 0.5%1, %, 2%, 4%, 5%, 7%, 8%0, 1, 12%, 14%, 16%, 18%, 20% or the like, further preferably, 1%-10%

In some embodiments of the present invention, in order to apply the liquid crystal composition of the present application into liquid crystal display devices with high transmittance, the liquid crystal composition further comprises at least one compound of general formula A-1 and/or at least one compound of general formula A-2:

A-1

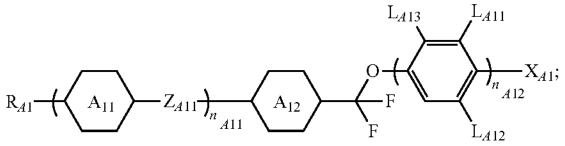

A-2

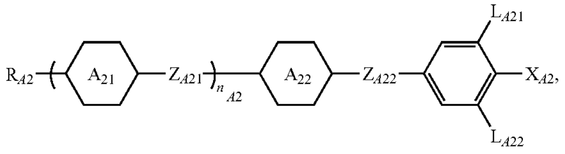

wherein, $R_{A1}$ and $R_{A2}$ each independently represents $C_{1-12}$ (for example, it can be $C_1$, $C_2$, $C_3$, $C_4$, $C_5$, $C_6$, $C_7$, $C_8$, $C_9$, $C_{10}$, $C_{11}$ or $C_{12}$) linear alkyl, $C_{3-12}$ (for example, it can be $C_3$, $C_4$, $C_5$, $C_6$, $C_7$, $C_8$, $C_9$, $C_{10}$, $C_{11}$ or $C_{12}$) branched alkyl,

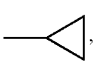, 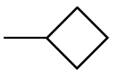 or 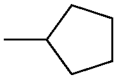, wherein, one or at least two nonadjacent —$CH_2$— in the $C_{1-12}$ linear alkyl, $C_{3-12}$ branched alkyl,

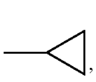, 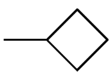 or 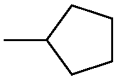

can each be independently replaced by —CH═CH—, —C≡C—, —O—, —CO—, —CO—O— or —O—CO—, and one or at least two —H in the $C_{1-12}$ linear alkyl and $C_{3-12}$ branched alkyl can each be independently replaced by —F or —Cl;

ring

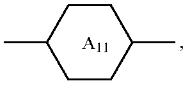, ring 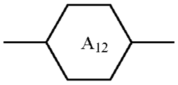, ring

-continued

 ring 

each independently represents

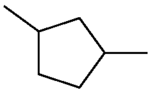, 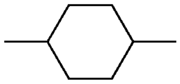,

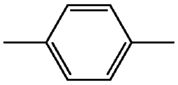 or 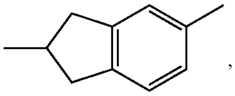, wherein one or at least two —$CH_2$— in

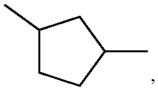, 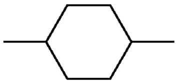 and

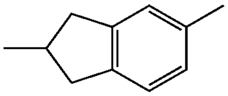

can be replaced by —O—, one or at least two single bond in the rings can be replaced by double bond; one or at least two —H on

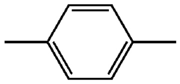 and 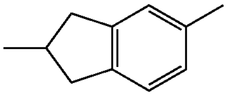

can each be independently replaced by —F, —Cl or —CN, one or at least two —CH═ in the rings can be replaced by —N═;

$Z_{A11}$, $Z_{A21}$ and $Z_{A22}$ each independently represents single bond, —$CH_2CH_2$—, —$CF_2CF_2$—, —CO—O—, —O—CO—, —O—CO—O—, —CH═CH—, —CF═CF—, —$CH_2O$— or —$OCH_2$—;

$L_{A11}$, $L_{A12}$, $L_{A13}$, $L_{A21}$ and $L_{A22}$ each independently represents —H, $C_{1-3}$ (for example, it can be $C_1$, $C_2$ or $C_3$) alkyl or halogen atom;

$X_{A1}$ and $X_{A2}$ each independently represents halogen atom, $C_{1-5}$ (for example, it can be $C_1$, $C_2$, $C_3$, $C_4$ or $C_5$) halogenated alkyl, $C_{1-5}$ (for example, it can be $C_1$, $C_2$, $C_3$, $C_4$ or $C_5$) halogenated alkoxy, $C_{2-5}$ (for example, it can be $C_2$, $C_3$, $C_4$ or $C_5$) halogenated alkenyl, $C_{2-5}$ (for example, it can be $C_2$, $C_3$, $C_4$ or $C_5$) halogenated alkenoxy;

$n_{A11}$ represents 0, 1, 2 or 3, wherein when $n_{A11}$ represents 2 or 3, ring

can be same or different, and $Z_{A11}$ can be same or different;

$n_{A12}$ represents 1 or 2, wherein when $n_{A12}$ represents 2, ring

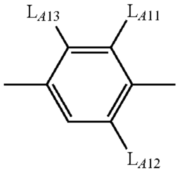

can be same or different;

$n_{A2}$ represents 0, 1, 2 or 3, wherein when $n_{A2}$ represents 2 or 3, ring

can be same or different, and $Z_{A21}$ can be the same or different.

In some embodiments of the present invention, the compound of general formula A-1 is any one or the combination of at least two of the compounds with the following structures:

A-1-1

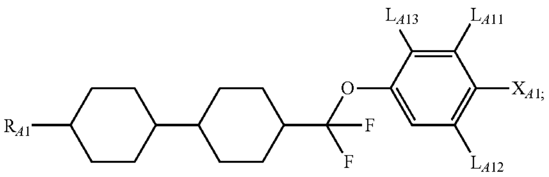

A-1-2

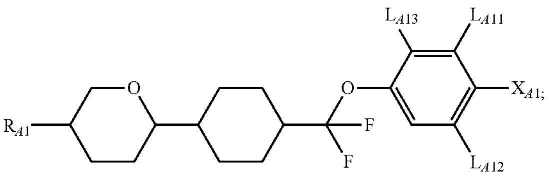

A-1-3

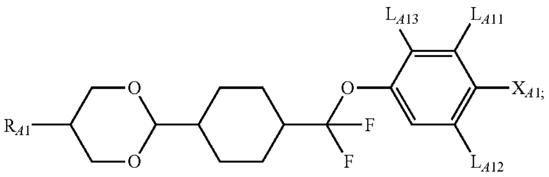

A-1-4

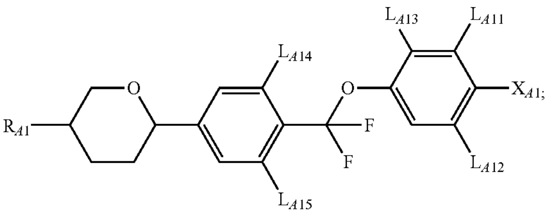

A-1-5

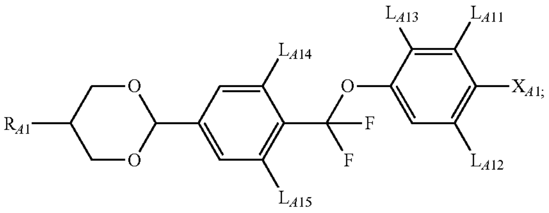

A-1-6

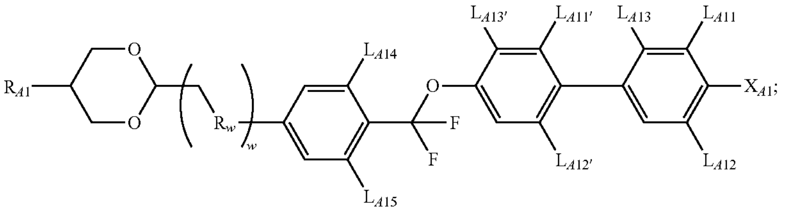

A-1-7

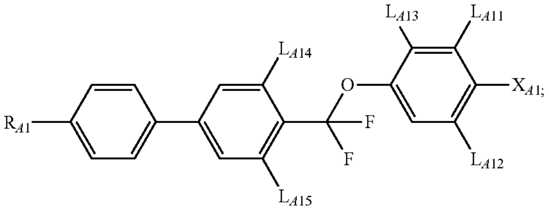

A-1-8

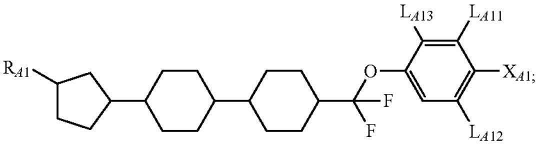

-continued
A-1-9
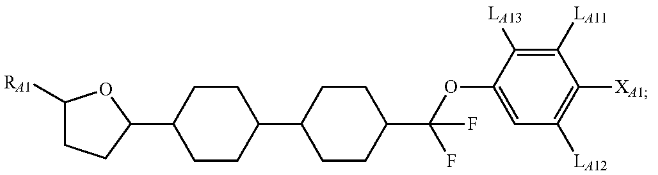
A-1-10
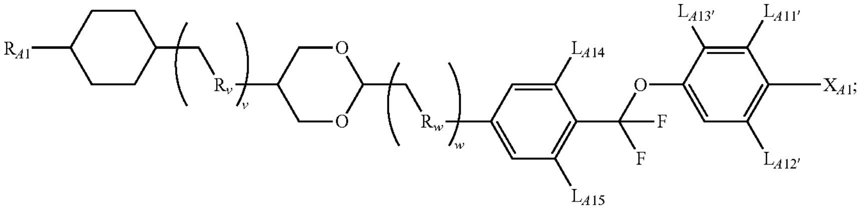
A-1-11
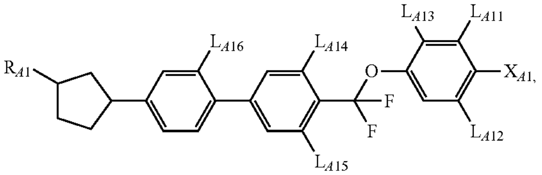
A-1-12
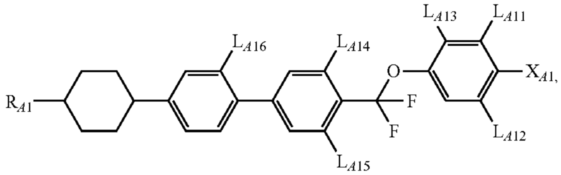
A-1-13
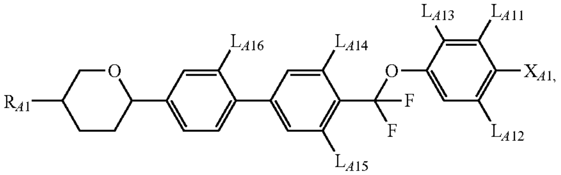
A1-14
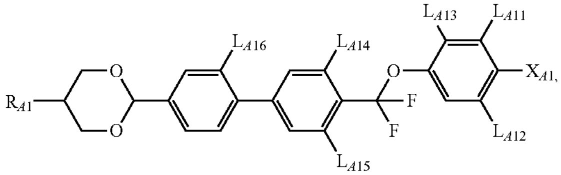
A-1-15
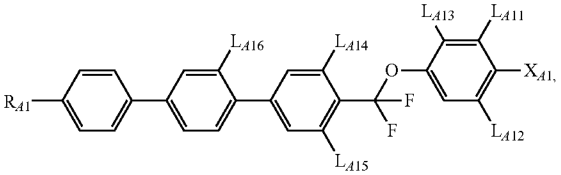
A-1-16
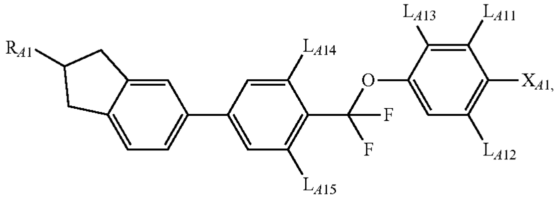
A-1-17
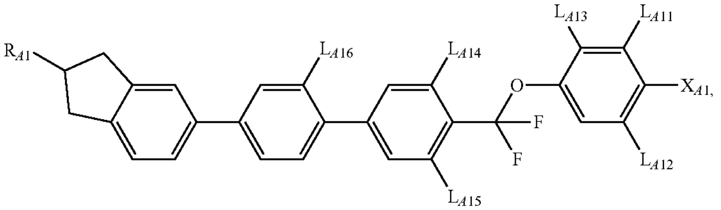
and
A-1-18
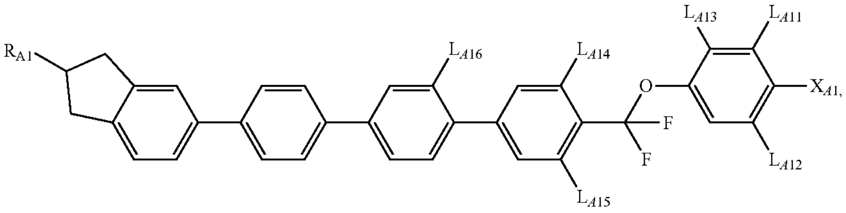

wherein, $R_{A1}$ represents $C_{1-8}$ (for example, it can be $C_1$, $C_2$, $C_3$, $C_4$, $C_5$, $C_6$, $C_7$ or $C_8$) linear alkyl, $C_{3-8}$ (for example, it can be $C_3$, $C_4$, $C_5$, $C_6$, $C_7$ or $C_8$) branched alkyl,

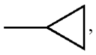, 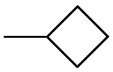 or 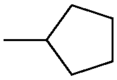, wherein one or at least two nonadjacent —$CH_2$— in the $C_{1-8}$ linear alkyl and $C_{3-8}$ branched alkyl can each be independently replaced by —CH═CH—, —C≡C—, —O—, —CO—, —CO—O— or —O—CO—, and one or at least two —H in the $C_{1-8}$ linear alkyl, $C_{3-8}$ branched alkyl

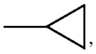, 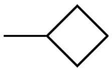 or 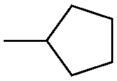

can each be independently replaced by —F or —Cl;

$R_v$ and $R_w$ each independently represents —$CH_2$— and —O—;

v and w each independently represents 0 or 1;

$L_{A11}$, $L_{A12}$, $L_{A11}'$, $L_{A12}'$, $L_{A14}$, $L_{A15}$ and $L_{A16}$ each independently represents —H or —F;

$L_{A13}$ and $L_{A13}'$ each independently represents —H or —$CH_3$; and $X_{A1}$ represents —F, —$CF_3$ or —$OCF_3$.

In some embodiments of the present invention, in the liquid crystal composition, percentage by weight of the compound of general formula A-1 is 0.1%-50%, for example, it can be 0.1%, 1%, 4%, 6%, 8%, 10, 12%, 14%, 16%, 18%, 20%, 22%, 24%, 26%, 28%, 30%, 32%, 34%, 36%, 38%, 40%, 42%, 44%, 46%, 48%, 50% or the like.

In some embodiments of the present invention, the compound of general formula A-2 is any one or the combination of at least two of the compounds with the following structures:

A-2-1

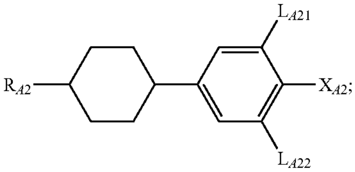

A-2-2

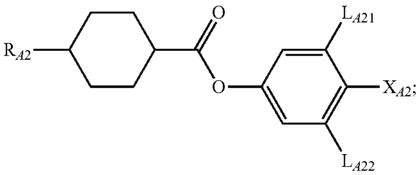

A-2-3

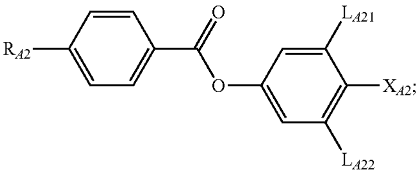

-continued

A-2-4

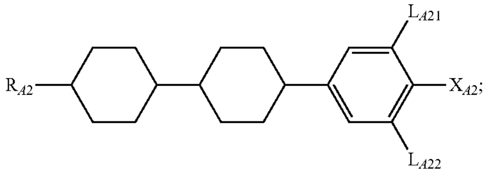

A-2-5

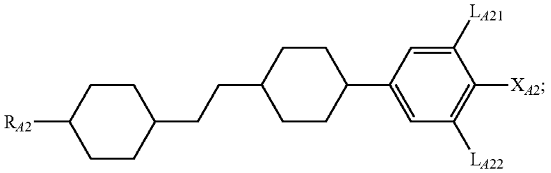

A-2-6

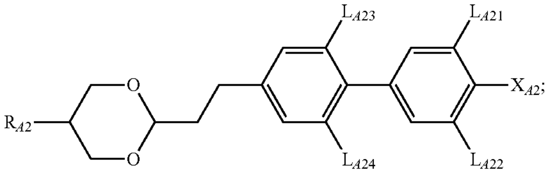

A-2-7

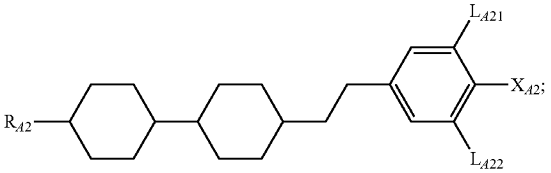

A-2-8

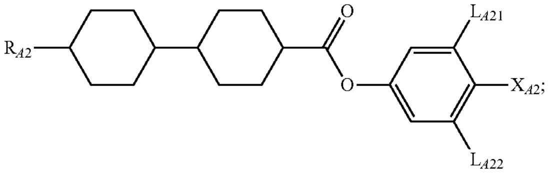

A-2-9

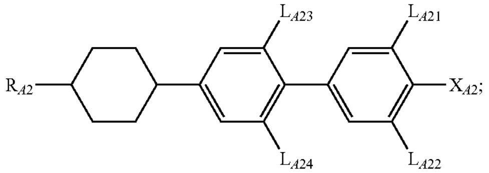

A-2-10

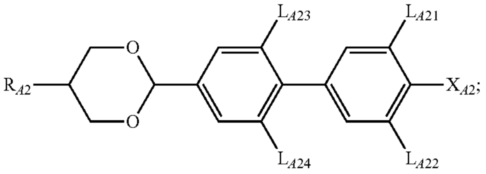

A-2-11

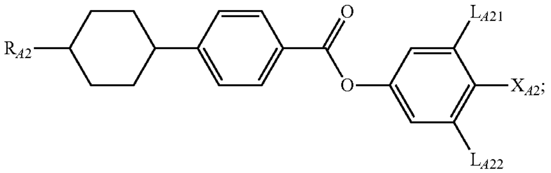

-continued

A-2-12

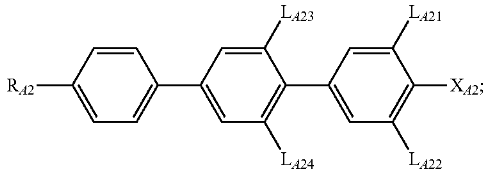

A-2-13

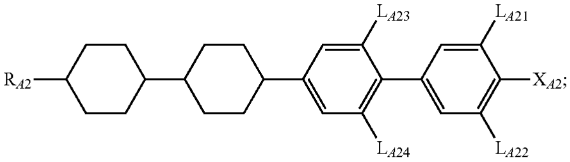

A-2-14

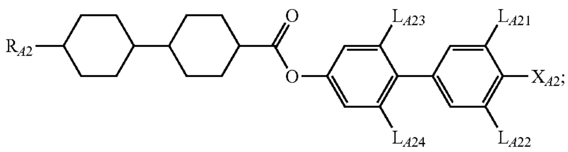

A-2-15

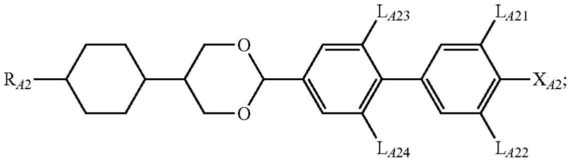

A-2-16

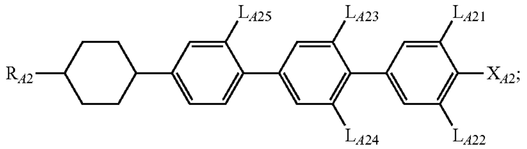

and

A-2-17

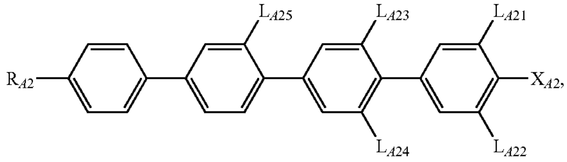

wherein, $R_{A2}$ represents $C_{1-8}$ (for example, it can be $C_1$, $C_2$, $C_3$, $C_4$, $C_5$, $C_6$, $C_7$ or $C_8$) linear alkyl, $C_{3-8}$ (for example, it can be $C_3$, $C_4$, $C_5$, $C_6$, $C_7$ or $C_8$) branched alkyl, wherein one or at least two nonadjacent —$CH_2$— in the $C_{1-8}$ linear alkyl and $C_{3-8}$ branched alkyl can each be independently replaced by —CH═CH—, —C≡C—, —O—, —CO—, —CO—O— or —O—CO—, and one or at least two —H in the $C_{1-8}$ linear alkyl and $C_{3-8}$ branched alkyl can each be independently replaced by —F or —Cl;

$L_{A21}$, $L_{A22}$, $L_{A23}$, $L_{A24}$ and $L_{A25}$ each independently represents —H or —F; and $X_{A2}$ represents —F, —$CF_3$, —$OCF_3$ or —$CH_2CH_2CH$═$CF_2$.

In some embodiments of the present invention, in the liquid crystal composition, percentage by weight of the compound of general formula A-2 is 0.1%-50%, for example, it can be 0.1%, 1%, 4%, 6%, 8%, 10, 12%, 14%, 16%, 18%, 20%, 22%, 24%, 26%, 28%, 30%, 32%, 34%, 36%, 38%, 40%, 42%, 44%, 46%, 48%, 50% or the like.

In some embodiments of the present invention, in the liquid crystal composition, sum of percentages by weight of the compound of general formula A-1 and the compound of general formula A-2 is 0.1%-60%, for example, it can be 0.1%, 1%, 4%, 6%, 8%, 10%, 12%, 14%, 16%, 18%, 20%, 22%, 24%, 26%, 28%, 30%, 32%, 34%, 36%, 38%, 40%, 42%, 44%, 46%, 48%, 50%, 52%, 54%, 56%, 58%, 60% or the like.

In some embodiments of the present invention, the liquid crystal composition further comprises at least one polymerizable compound of general formula RM:

RM

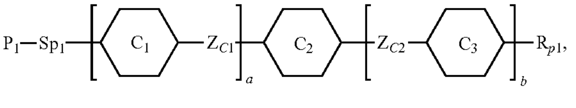

wherein, $R_{p1}$ represents —H, halogen atom, —CN, -$Sp_2$-$P_2$, $C_{1-12}$ (for example, it can be $C_1$, $C_2$, $C_3$, $C_4$, $C_5$, $C_6$, $C_7$, $C_8$, $C_9$, $C_{10}$, $C_{11}$ or $C_{12}$) linear alkyl, $C_{3-12}$ (for example, it can be $C_3$, $C_4$, $C_5$, $C_6$, $C_7$, $C_8$, $C_9$, $C_{10}$, $C_{11}$ or $C_{12}$) branched alkyl,

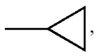, 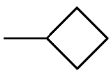 or 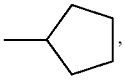, wherein one or at least two nonadjacent —$CH_2$— in $C_{1-12}$ linear alkyl, $C_{3-12}$ branched alkyl,

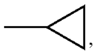, 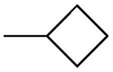 or 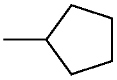

can each be independently replaced by —CH═CH—, —C≡C—, —O—, —CO—, —CO—O— or —O—CO—, and one or at least two —H can each be independently replaced by —F or —Cl;

ring

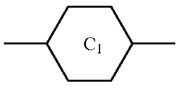 and ring 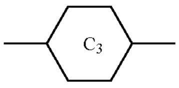

each independently represents

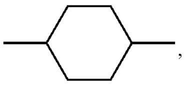,  or

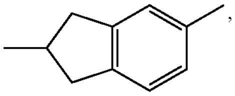, wherein one or at least two —$CH_2$— in

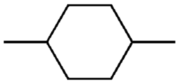 and 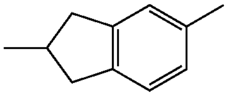

can be replaced by —O—, one or at least two single bond in the rings can be replaced by double bond; one or at least two —H on

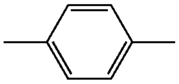 and 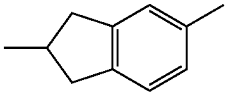

can each be independently replaced by —F, —Cl, —CN, -$Sp_3$-$P_3$, $C_{1-12}$ (for example, it can be $C_1$, $C_2$, $C_3$, $C_4$, $C_5$, $C_6$, $C_7$, $C_8$, $C_9$, $C_{10}$, $C_{11}$ or $C_{12}$) halogenated or unhalogenated linear alkyl, $C_{1-11}$ (for example, it can be $C_1$, $C_2$, $C_3$, $C_4$, $C_5$, $C_6$, $C_7$, $C_8$, $C_9$, $C_{10}$ or $C_{11}$) halogenated or unhalogenated linear alkoxy,

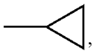, 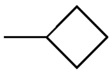 or 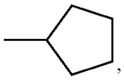, and one or at least two —CH= in the rings can be replaced by —N=;

ring

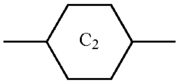 represents

, 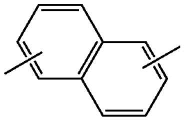, 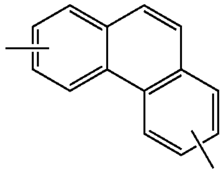, 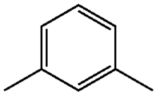 or 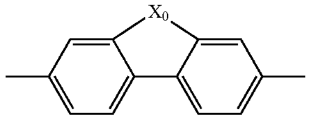, wherein one or at least two —H on ring

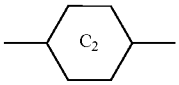

can each be independently replaced by —F, —Cl, —CN, -$Sp_3$-$P_3$, $C_{1-12}$ (for example, it can be $C_1$, $C_2$, $C_3$, $C_4$, $C_5$, $C_6$, $C_7$, $C_8$, $C_9$, $C_{10}$, $C_{11}$ or $C_{12}$) halogenated or unhalogenated linear alkyl, $C_{11}$ (for example, it can be $C_1$, $C_2$, $C_3$, $C_4$, $C_5$, $C_6$, $C_7$, $C_8$, $C_9$, $C_{10}$ or $C_{11}$) halogenated or unhalogenated linear alkoxy,

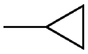, 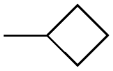 or 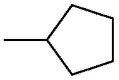, one or at least two —CH= in the rings can each be independently replaced by —N=, $X_0$ represents —O—, —S—, —CO—, —$CF_2$—, —NH— or —NF—;

$P_1$, $P_2$ and $P_3$ each independently represents polymerizable group;

$Sp_1$, $Sp_2$ and $Sp_3$ each independently represents spacer group or single bond;

$Z_{C1}$ and $Z_{C2}$ each independently represents —O—, —S—, —CO—, —CO—O—, —O—CO—, —O—CO—O—, —$CH_2$O—, —O$CH_2$—, —$CH_2$S—, —S$CH_2$—, —$CF_2$O—, —O$CF_2$—, —$CF_2$S—, —S$CF_2$—, —$(CH_2)_d$—, —$CF_2CH_2$—, —$CH_2CF_2$—, —$(CF_2)_d$—, —CH=CH—, —CF=CF—, —CH=CF—, —CF=CH—, —C≡C—, —CH=CH—CO—O—, —O—CO—CH=CH—, —$CH_2CH_2$—CO—O—, —O—CO—$CH_2CH_2$—, —$CHR^1$—, —$CR^1R^2$— or single bond, wherein $R^1$ and $R^2$ each independently represents $C_{1-12}$ (for example, it can be $C_1$, $C_2$, $C_3$, $C_4$, $C_5$, $C_6$, $C_7$, $C_8$, $C_9$, $C_{10}$, $C_{11}$ or $C_{12}$) linear alkyl, $C_{3-12}$ (for example, it can be $C_3$, $C_4$, $C_5$, $C_6$, $C_7$, $C_8$, $C_9$, $C_{10}$, $C_{11}$ or $C_{12}$) branched alkyl, and d represents an integer of 1-4 (for example, it can be 1, 2, 3 or 4);

a represents 0, 1 or 2, b represents 0 or 1, wherein when a represents 2, ring

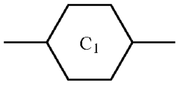

can be the same or different, and $Z_{C1}$ can be the same or different.

The polymerizable groups involved in the present invention are groups suitable for polymerization reactions (for example, radical or ionic bond polymerization, addition polymerization or condensation polymerization), or groups suitable for addition or condensation on the polymer backbone. For chain polymerization, a polymerizable group containing —CH=CH— or —C≡C— is particularly preferred, and for ring-opening polymerization, for example, an oxetane or epoxy group is particularly preferred.

In some embodiments of the present invention, the polymerizable groups $P_1$, $P_2$ and $P_3$ each independently represents

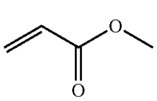, 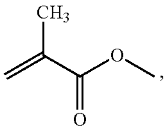, 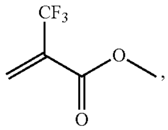,

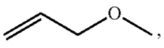, 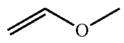, 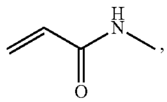,

-continued

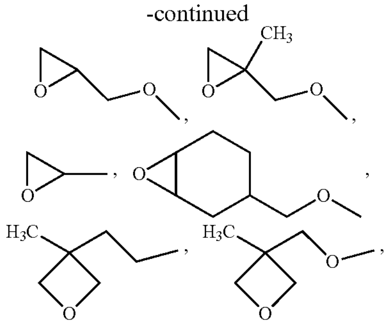

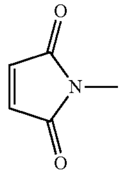 or —SH; preferably,

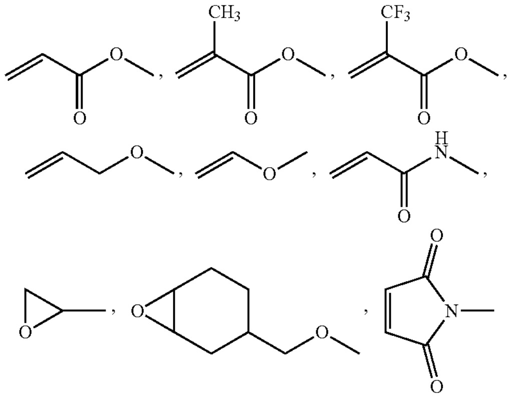

or —SH; further preferably,

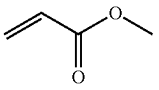 or 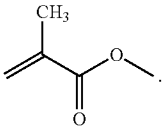.

It should be noted that the term "spacer group" is known to the person skilled in the art and is described in the references (for example, Pure Appl. Chem. 2001,73(5),888 and C. Tschierske, G. Pelzl, S. Diele, Angew. Chem. 2004, 116, 6340-6368). As used herein, the term "spacer group" represents a flexible group which connects the mesogenic group and the polymerizable group in a polymerizable compound. For example, $-(CH_2)_{p1}-$, $-(CH_2CH_2O)_{q1}-CH_2CH_2-$, $-(CH_2CH_2S)_{q1}-CH_2CH_2-$, $-(CH_2CH_2NH)_{q1}-CH_2CH_2-$, $-CR^0R^{00}-(CH_2)_{p1}-$ or $-(SiR^0R^{00}-O)_{p1}-$ are representative spacer groups, wherein $p_1$ represents an integer of 1-12, $q_1$ represents an integer of 1-3, $R^0$ and $R^{00}$ each independently represents —H, $C_{1-12}$ linear or branched alkyl, or $C_{3-12}$ cyclic alkyl. In the present invention, the preferred spacer group is $-(CH_2)_{p1}-$, $-(CH_2)_{p1}-O-$, $-(CH_2)_{p1}-O-CO-$, $-(CH_2)_{p1}-CO-O-$, $-(CH_2)_{p1}-O-CO-O-$ or $-CR^0R^{00}-(CH_2)_{p1}-$.

In some embodiments of the present invention, the compound of general formula RM is any one or the combination of at least two of the compounds with the following structures:

RM-1

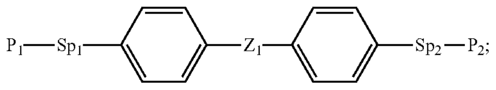

RM-2

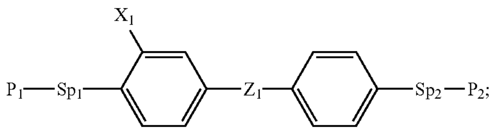

RM-3

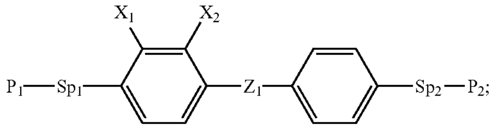

RM-4

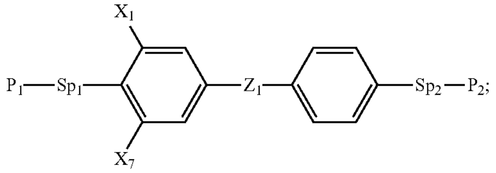

RM-5

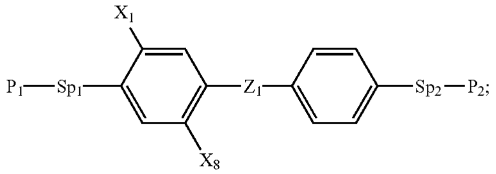

RM-6

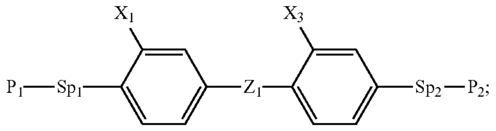

RM-7

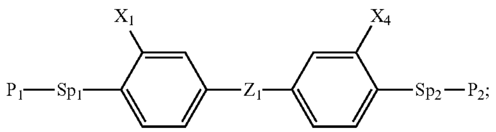

RM-8

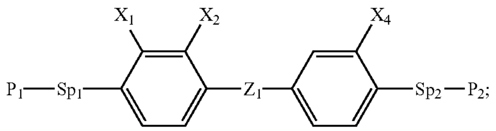

RM-9

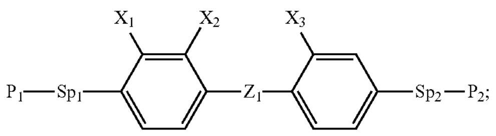

RM-10

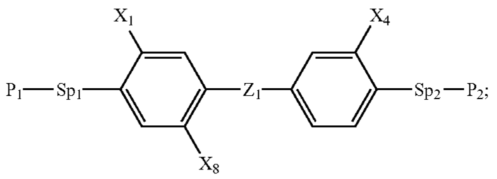

-continued
RM-11
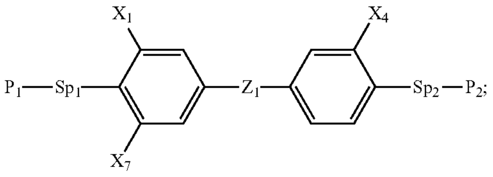
RM-12
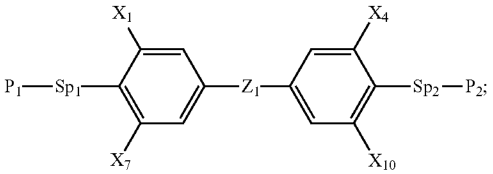
RM-13
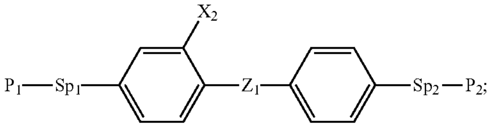
RM-14
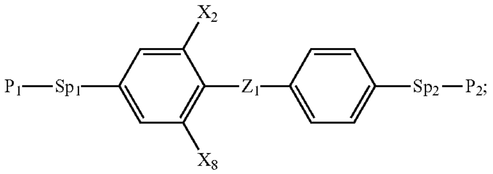
RM-15
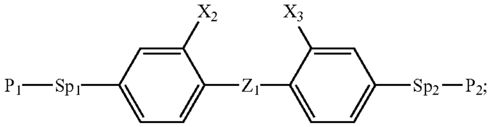
RM-16
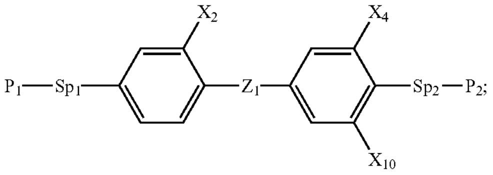
RM-17
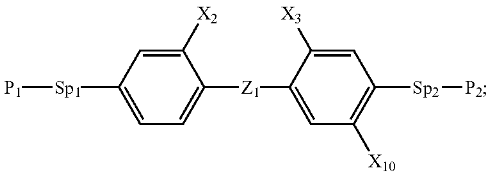
RM-18
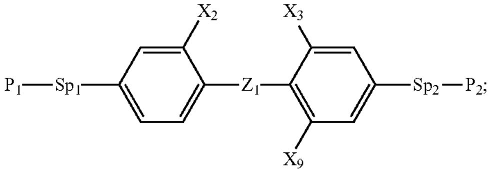
-continued
RM-19
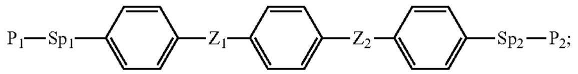
RM-20
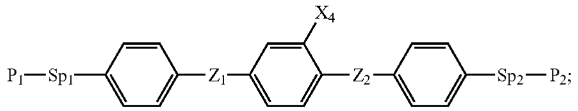
RM-21
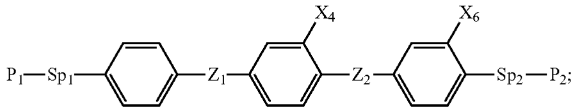
RM-22
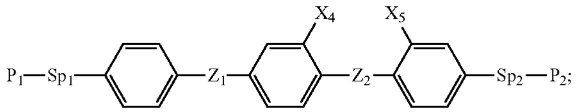
RM-23
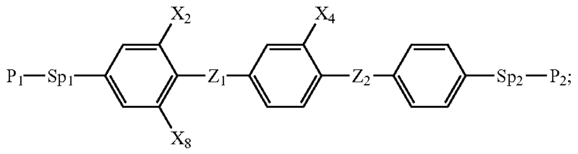
RM-24
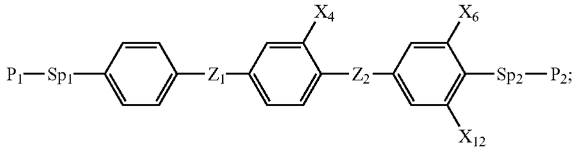
RM-25
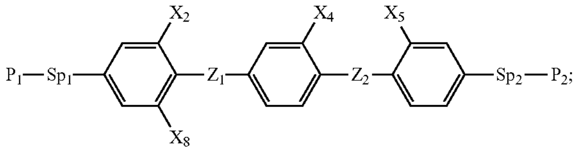
RM-26
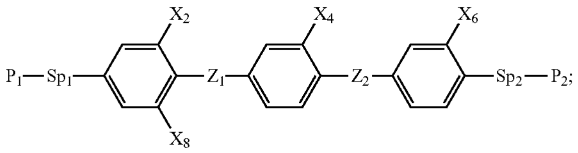
RM-27
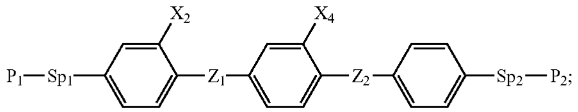
RM-28
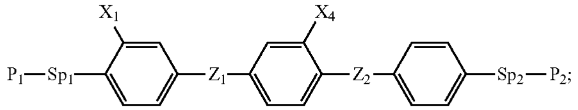

-continued

RM-29

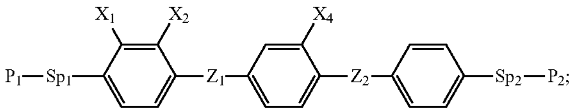

RM-30

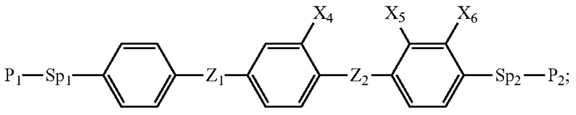

RM-31

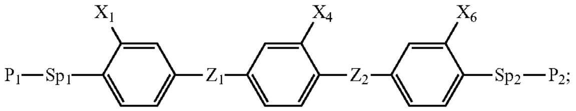

RM-32

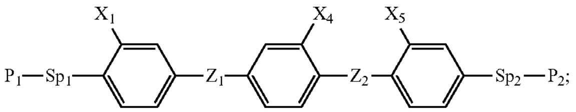

RM-33

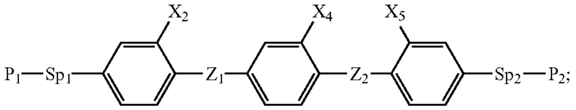

RM-34

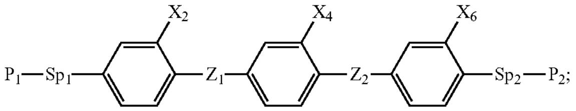

RM-35

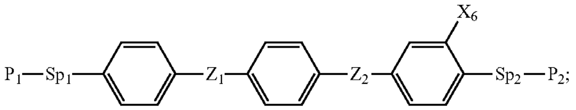

-continued and

RM-36

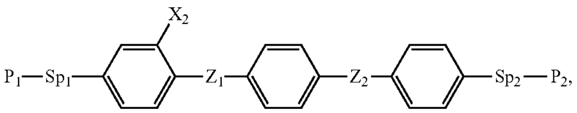

wherein, $X_1$-$X_{10}$ and $X_{12}$ each independently represents —F, —Cl, -$Sp_3$-$P_3$, $C_{1-5}$ (for example, it can be $C_1$, $C_2$, $C_3$, $C_4$ or $C_5$) linear alkyl, $C_{1-5}$ (for example, it can be $C_1$, $C_2$, $C_3$, $C_4$ or $C_5$) alkoxy,

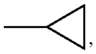, 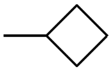 or 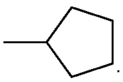.

In some embodiments of the present invention, in the liquid crystal composition, percentage by weight of the polymerizable compound of general formula RM is 0.001%-5%, for example, 0.001%, 0.002%, 0.004%, 0.005%, 0.006%, 0.008%, 0.01%, 0.02%, 0.04%, 0.06%, 0.08%, 0.1%, 0.2%, 0.25%, 0.26%, 0.27%, 0.28%, 0.29%, 0.3%, 0.32%, 0.33%, 0.34%, 0.35%, 0.4%, 0.5%, 0.6%, 0.8%, 1%, 1.2%, 1.6%, 1.8%, 2%, 2.5%, 3%, 3.5%, 4% 4.5% 5% or the like.

In some embodiments of the present invention, the liquid crystal composition further comprises at least one additive.

The additives contain nematic liquid crystal, smectic liquid crystal, cholesteric liquid crystal, dopants, antioxidant, ultraviolet absorber, infrared absorber, polymerizable monomer or light stabilizer.

In some embodiments of the present invention, the dopant comprises any one or the combination of at least two of the following compounds:

C15

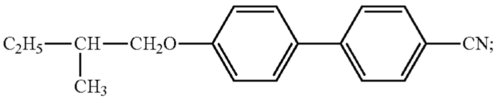

CB15

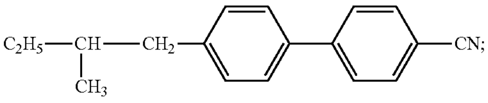

CM21

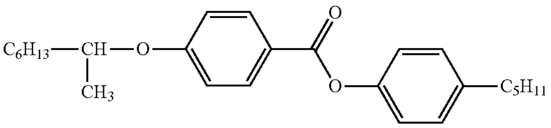
;

R/S-811

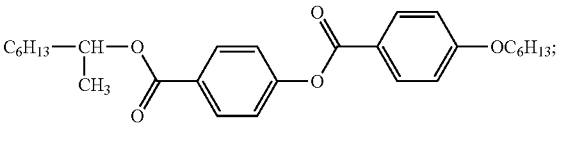

CM 44

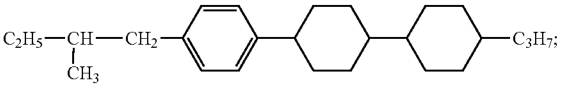

CM 45

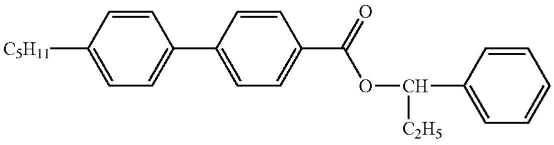
;

-continued

CM 47

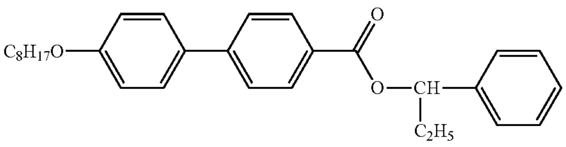

;

CN

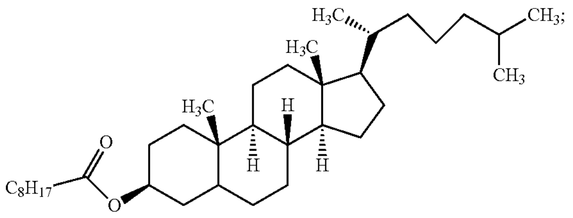

R/S-1011

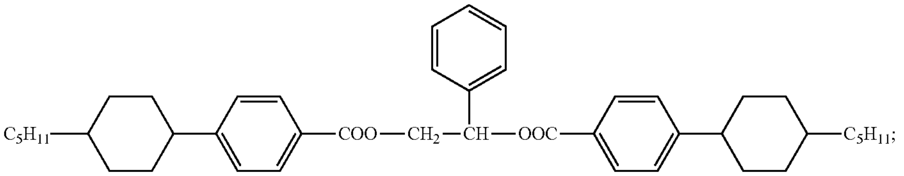

R/S-2011

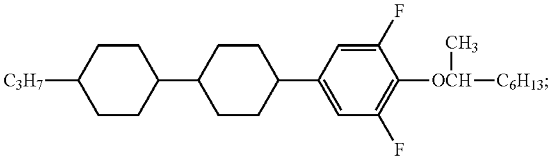

R/S-3011

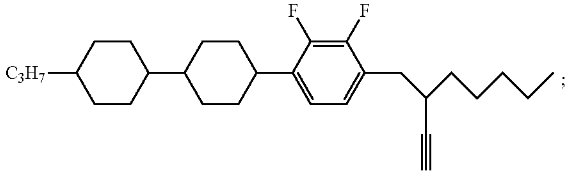

R/S-4011

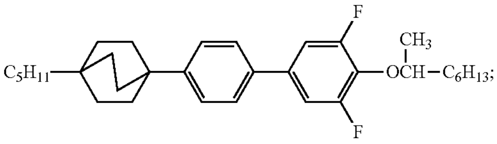

and

R/S-5011

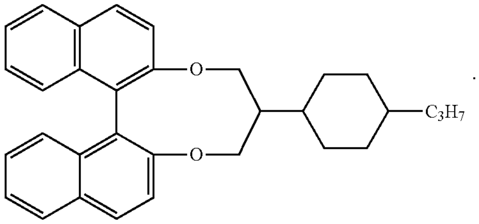

.

In some embodiments of the present invention, in the liquid crystal composition, percentage by weight of the dopant is 0%-5% for example, it can be 0%, 0.01%, 0.05%, 0.1%, 0.2%, 0.5%, 1%, 1.5%, 2%, 2.5%, 3%, 3.5%, 4%, 4.5%, 5%, or the like, further preferably, 0.01%-1%.

In some embodiments of the present invention, additives (such as antioxidant, light stabilizer, ultraviolet absorber and the like) are preferably to be the following compounds:

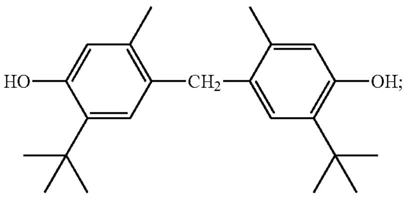

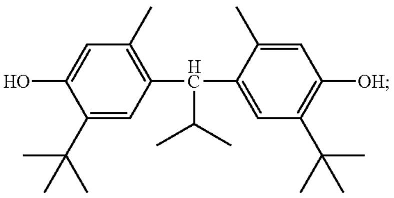

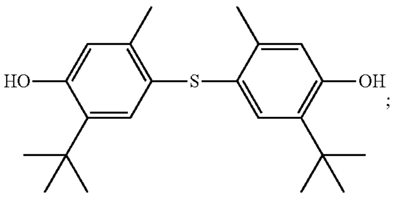

;

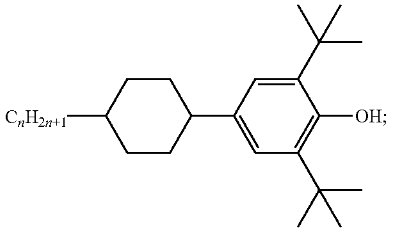

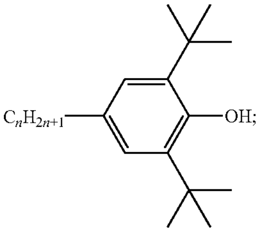

-continued
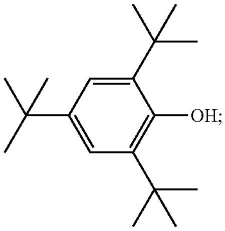
;
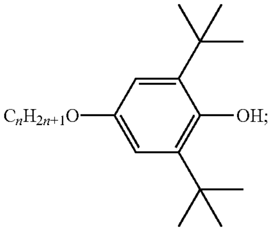
;
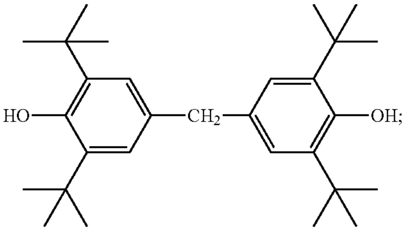
;
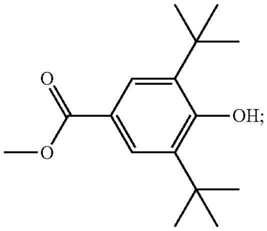
;
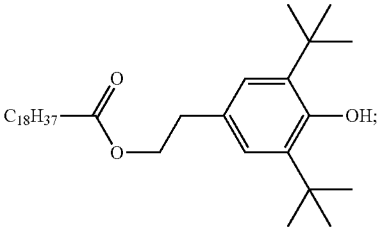
;
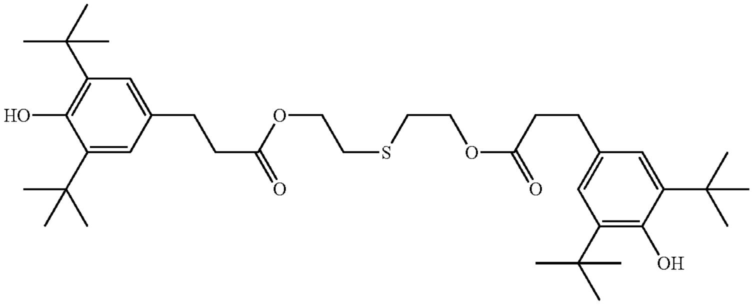
;
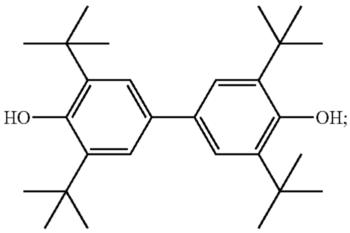
;
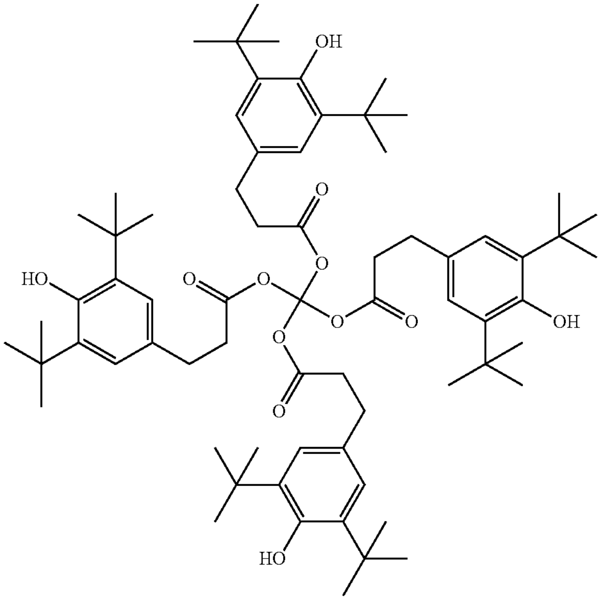
;
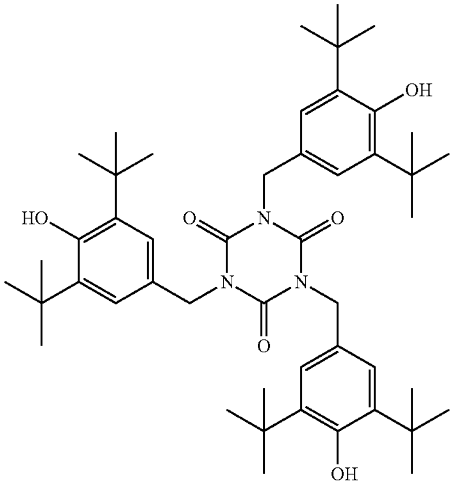
;
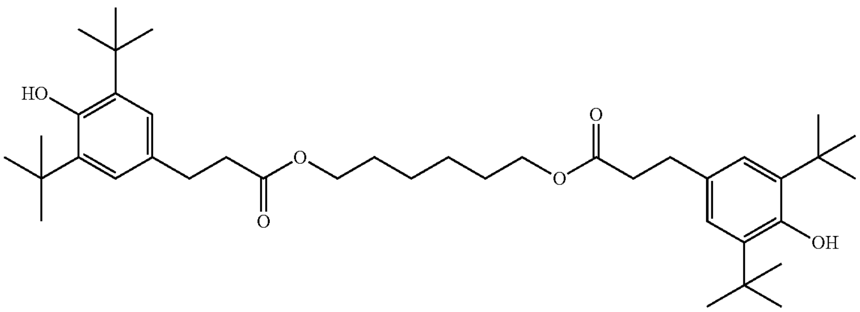
;

-continued
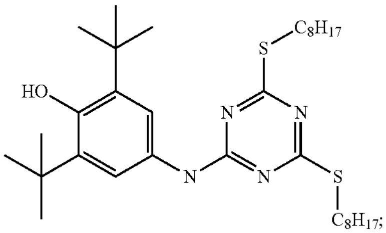
;
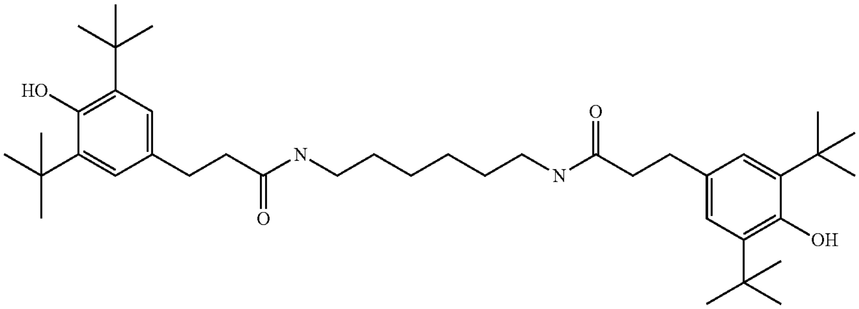
;
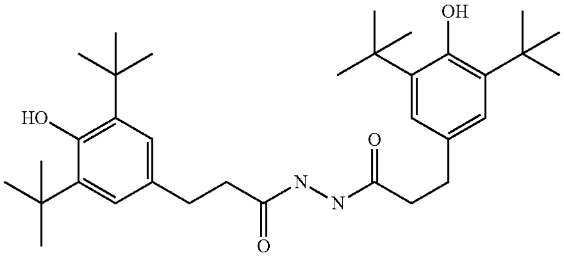
;
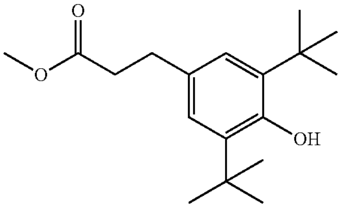
;
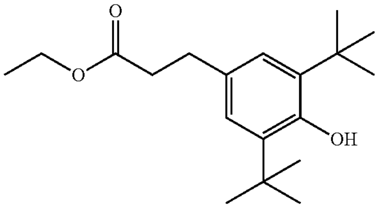
;
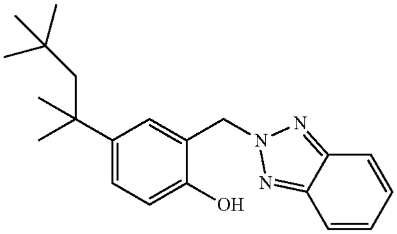
;
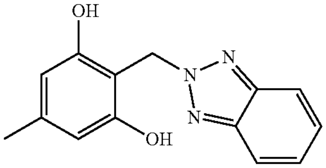
;
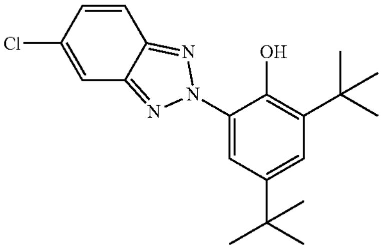
;
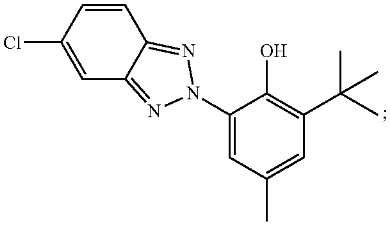
;
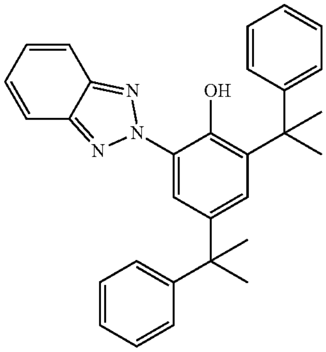
;
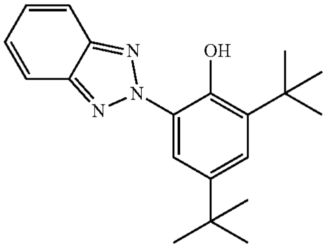
;
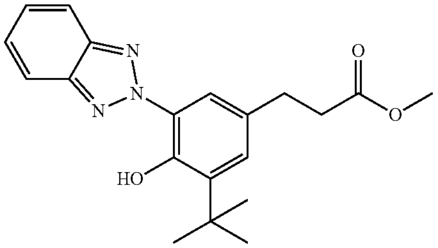
;

-continued
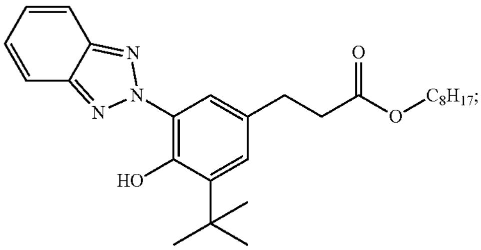
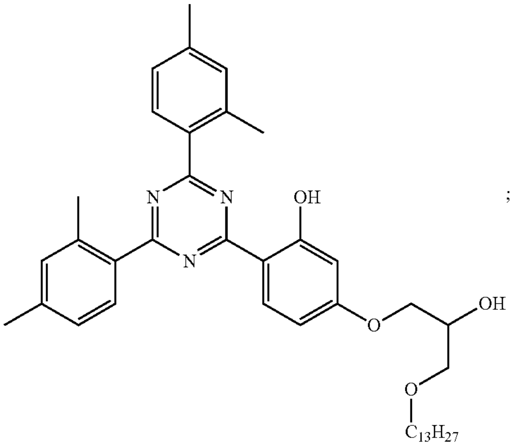
;
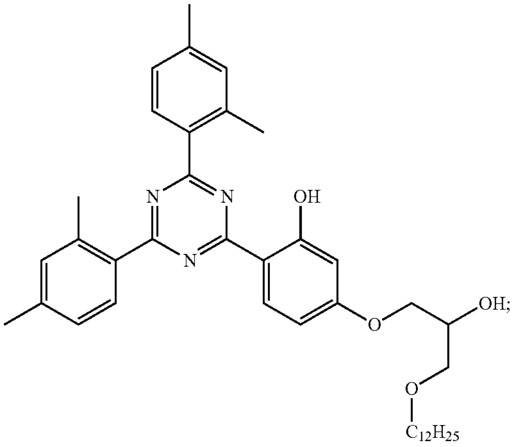
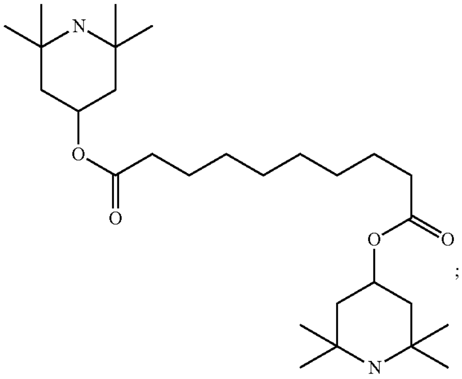
;
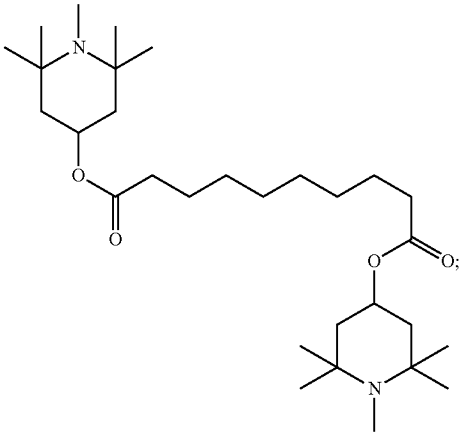
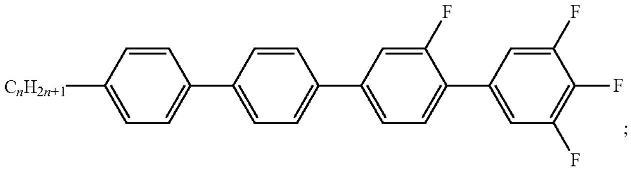
;
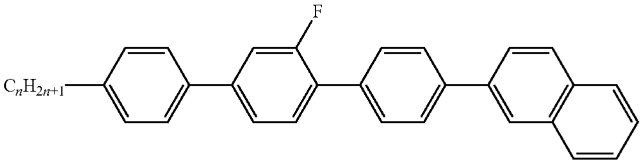
;
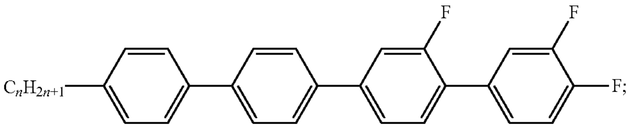

wherein, n represents a positive integer of 1-12, for example, it can be 1, 2, 4, 6, 8, 9, 10, 11, 12 or the like.

In some embodiments of the present invention, the antioxidant is selected from any one or the combination of at least two of the following compounds:

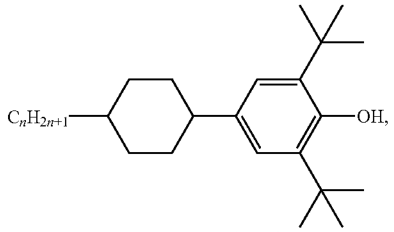

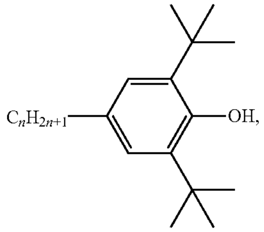

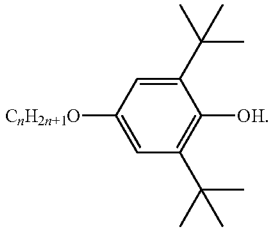

In some embodiments of the present invention, in the liquid crystal composition, percentage by weight of the light stabilizer is 0%-5%, for example, it can be 0%, 0.01%, 0.05%, 0.1%, 0.2%, 0.5%, 1%, 1.5%, 2%, 2.5%, 3%, 3.5%, 4%, 4.5%, 5% or the like, further preferably, 0.01%-1%.

It should be noted that, for an easier calculation, in the present invention, the sum of the weight percentages of the compounds having different general formulas in the liquid crystal composition is one hundred percent, and the content of the additives is not counted within the total content of the liquid crystal composition, that is, the addition of the additives will result in the total content of the components in the liquid crystal composition being >100%.

In some embodiments of the present invention, the liquid crystal composition further comprises a polymerization initiator, exemplarily including, but not limited to: benzoin ethers, benzophenones, acetophenones, benzoin bis-ethers, acyl phosphine oxides and so forth.

In a second aspect, the present invention provides a liquid crystal display device, and the liquid crystal display device comprises a liquid crystal composition as described in the first aspect.

Compared with the prior art, the present invention has the following beneficial effects:

Via designing the specific constitution of the liquid crystal composition, and further using the compound of general formula I containing cycloalkenyl groups in conjunction with the compound of general formula II and the compound of general formula III, the liquid crystal composition prepared in the present invention has an appropriate optical anisotropy, an appropriate clearing point, an appropriate absolute value of dielectric anisotropy, a larger K value, a smaller rotational viscosity, a shorter response time, a higher transmittance, a higher contrast rate and a longer low-temperature storage time, which makes the liquid crystal display device containing the liquid crystal composition of the present invention have a wider using temperature range, a lower threshold voltage, a better contrast rate, a faster response speed, a faster refresh speed and a higher transmittance and suitable for fast-response, high-contrast VA, IPS, NFFS display modes and the like.

DETAILED EMBODIMENTS

For an easier understanding of the present invention, the present invention enumerates the Examples below. It should be clear for the person skilled in the art that, the Examples are only for helping to understand the present invention, and shall not be seen as specific limitations on the present invention.

For the convenience of the expression, in the following examples, the group structures of the liquid crystal composition are represented by the codes listed in Table 1:

TABLE 1

| Unit structure of group | Code | Name of group |
|---|---|---|
| 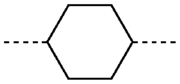 | C | 1,4-cyclohexylidene |
| 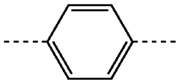 | P | 1,4-phenylene |
| 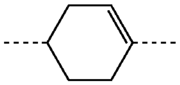 | L | 1, 4-cyclohexene |
| 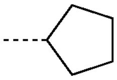 | C(5) | 1-cyclopentyl |

TABLE 1-continued

| Unit structure of group | Code | Name of group |
| --- | --- | --- |
| 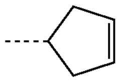 | C(5,V) | 1-cyclopentenyl |
| 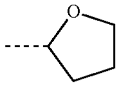 | THF | tetrahydrofuran-2-yl |
| 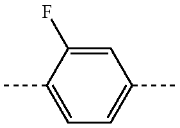 | G' | 3-fluoro-1,4-phenylene |
| 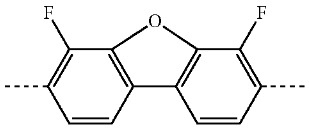 | B(O) | 4,6-difluoro-dibenzo[b,d]furan-3,7-diyl |
| 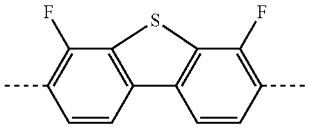 | B(S) | 4,6-difluoro-dibenzo[b,d]thiophene-3,7-diyl |
| 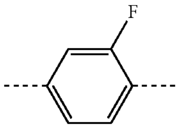 | G | 2-fluoro-1,4-phenylene |
| 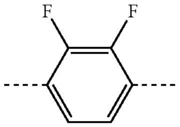 | W | 2,3-difluoro-1,4-phenylene |
| —O— | O | oxygen substituent |
| —F | F | fluorine substituent |
| —CH═CH— or —CH═$CH_2$ | V | ethenylene or ethenyl |
| 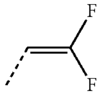 | V(2F) | difluoroenyl |
| —COO— | E | ester bridge bond |
| —$CH_2O$— | 1O | methyleneoxy |
| —$CH_2CH_2$— | 2 | ethyl bridge group |
| —$C_2H_{2n+1}$ or —$C_nH_{2n}$— | n (n represents a positive integer of 1-12) | alkyl or alkylene |

In Table 1, broken lines represent the binding sites of the groups.

Take the compound with the following structural formula as an example:

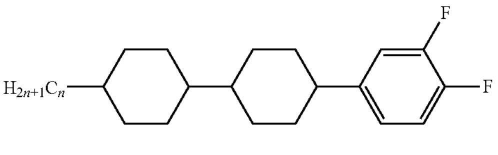

represented by the codes listed in Table 1, this structural formula can be expressed as nCCGF, n in the code represents the number of the carbon atoms of the alkyl on the left, for example, n is "3", meaning that the alkyl is —$C_3H_7$; C in the code represents cyclohexylidene, G represents 2-fluoro-1,4-phenylene, and F represents fluorine.

In the following Examples and Comparative Examples, the abbreviated codes of performance test items are shown in Table 2:

TABLE 2

| The abbreviated codes of the performance test items | |
|---|---|
| Code of test items | Meaning |
| Cp | clearing point (nematic-isotropy phases transition temperature, ° C.) |
| Δn | optical anisotropy (589 nm, 20° C.) |
| Δε | dielectric anisotropy (1 KHz, 20° C.) |
| $K_{11}$ | splay elastic constant |
| $K_{33}$ | bend elastic constant |
| $\gamma_1$ | rotational viscosity (20° C.)/mPa · s |
| τ | response time (ms) |
| $T_r$ | transmittance (%) |
| CR | contrast rate |
| LTS(−40° C.) | low-temperature storage stability (stored at −40° C. and the time when crystal precipitation is observed, h) |

wherein, Δn: tested using an Abbe Refractometer under a sodium lamp (589 nm) light source at 20° C.;

Cp (° C.): tested by melting point apparatus quantitative method;

Δε: Δε=ε//−ε⊥, in which, ε// is the dielectric constant parallel to the molecular axis, ε⊥ is the dielectric constant perpendicular to the molecular axis, test conditions: 20° C., 1 KHz, VA-type test cell with a cell gap of 6 μm;

$K_{11}$, $K_{33}$: $K_{11}$ and $K_{33}$ are obtained via testing the capacitance-voltage characteristic curves μ(C-V curves) of liquid crystal by LCR meter and VA test cell and calculating; test conditions: 6 m VA test cell, V=0.1~20 V;

$\lambda_1$: tested using a LCM-2 type liquid crystal physical property evaluation system; test conditions: 20° C., 160-240 V, the cell gap is 20 μm;

τ: tested using a DMS505 tester at 25° C.; test conditions: 20° C., V100 driving, negative IPS-type test cell with a cell gap of 3.5 μm;

$T_r$: using DMS 505 photoelectric integrated tester to test the V-T curve of dimming device, taking the maximum value of transmittance on the V-T curve as the transmittance of the liquid crystal, the test cell is of negative IPS-type, the cell gap is 3.5 μm;

CR: testing the transmittance of the liquid crystal cell at a 255 gray level voltage and a 0 gray level voltage separately using DMS 505 tester, that is, $T_{r255}$ and $T_{r0}$, and it is obtained through $T_{r255}/T_{r0}$, test conditions: 20° C., negative IPS-type test cell with a cell gap of 3.5 μm;

LTS: nematic phase liquid crystal medium was placed in a 6 um VA test cell, stored at a constant temperature of −40° C., the time recorded when crystal precipitation is observed.

COMPARATIVE EXAMPLE 1

The present Comparative Example provides a liquid crystal composition comprising components in the percentages by weight as shown in the table below, and the performance tests are carried out by filling the same into the two substrates of the liquid crystal display device:

| Code of component | Content | Test result of performance parameters | |
|---|---|---|---|
| 3CWO2 (N-2) | 17 | Δn | 0.108 |
| 3CLWO2 (II-3) | 8 | Cp | 72 |
| 4CLWO2 (II-3) | 8 | Δε | −3.5 |

-continued

| Code of component | Content | Test result of performance parameters | |
|---|---|---|---|
| 5CLWO2 (II-3) | 8 | $K_{11}$ | 14.8 |
| 3CCV (M-1) | 21 | $K_{33}$ | 16.4 |
| 3CCV1 (M-1) | 12 | $\gamma_1$ | 71 |
| 1PP2V (M-4) | 8 | τ | 23.6 |
| 3PPWO2 (III-1) | 2 | Tr | 15.2 |
| 4PPWO2 (III-1) | 2 | CR | 1310 |
| 5PPWO2 (III-1) | 2 | LTS(−40° C.) | 120 |
| 2OB(S)O1C(5) | 6 | | |
| 4OB(S)O1C(5) | 6 | | |

COMPARATIVE EXAMPLE 2

The present Comparative Example provides a liquid crystal composition comprising components in the percentages by weight as shown in the table below, and the performance tests are carried out by filling the same into the two substrates of the liquid crystal display device:

| Code of component | Content | Test result of performance parameters | |
|---|---|---|---|
| 3CWO2 (N-2) | 17 | Δn | 0.103 |
| 3CCWO2 (N-7) | 8 | Cp | 68 |
| 4CCWO2 (N-7) | 8 | Δε | −3.5 |
| 5CCWO2 (N-7) | 8 | $K_{11}$ | 13.6 |
| 3CCV (M-1) | 21 | $K_{33}$ | 14.4 |
| 3CCV1 (M-1) | 12 | $\gamma_1$ | 66 |
| 1PP2V (M-4) | 8 | τ | 25.1 |
| 3PPWO2 (III-1) | 2 | Tr | 14.1 |
| 4PPWO2 (III-1) | 2 | CR | 1142 |
| 5PPWO2 (III-1) | 2 | LTS(−40° C.) | 168 |
| 2OB(S)O1C(5) | 6 | | |
| 4OB(S)O1C(5) | 6 | | |

COMPARATIVE EXAMPLE 3

The present Comparative Example provides a liquid crystal composition comprising components in the percentages by weight as shown in the table below, and the performance tests are carried out by filling the same into the two substrates of the liquid crystal display device:

| Code of component | Content | Test result of performance parameters | |
|---|---|---|---|
| 3CWO2 (N-2) | 17 | Δn | 0.103 |
| 3CLWO2 (II-3) | 8 | Cp | 75 |
| 4CLWO2 (II-3) | 8 | Δε | −3.4 |
| 5CLWO2 (II-3) | 8 | $K_{11}$ | 15.1 |
| 3CCV (M-1) | 21 | $K_{33}$ | 17 |
| 3CCV1 (M-1) | 12 | $\gamma_1$ | 73 |
| 1PP2V (M-4) | 8 | τ | 24.1 |
| 3CPWO2 (N-16) | 2 | Tr | 14.2 |
| 4CPWO2 (N-16) | 2 | CR | 1195 |
| 5CPWO2 (N-16) | 2 | LTS(−40° C.) | 168 |
| 2OB(S)O1C(5) | 6 | | |
| 4OB(S)O1C(5) | 6 | | |

EXAMPLE 1

The present Example provides a liquid crystal composition comprising components in the percentages by weight as shown in the table below, and the performance tests are carried out by filling the same into the two substrates of the liquid crystal display device:

| Code of component | Content | Test result of performance parameters | |
|---|---|---|---|
| 3CWO2 (N-2) | 17 | Δn | 0.11 |
| 3CLWO2 (II-3) | 8 | Cp | 74 |
| 4CLWO2 (II-3) | 8 | Δε | −3.5 |
| 5CLWO2 (II-3) | 8 | $K_{11}$ | 15.6 |
| 3CCV (M-1) | 21 | $K_{33}$ | 17.7 |
| 3CCV1 (M-1) | 12 | $\gamma_1$ | 70 |
| 1PP2V (M-4) | 8 | τ | 23.2 |
| 3PPWO2 (III-1) | 2 | Tr | 15.5 |
| 4PPWO2 (III-1) | 2 | CR | 1430 |
| 5PPWO2 (III-1) | 2 | LTS(−40° C.) | 168 |
| 2OB(S)O1C(5, V) (I-1) | 6 | | |
| 4OB(S)O1C(5, V) (I-1) | 6 | | |

It can be seen from the comparison of Comparative Examples 1-3 and Example 1 that via the optimization of the structures of the compound of general formula I, the compound of general formula II and the compound of general formula III, the liquid crystal composition of the present invention has a better optical anisotropy, a higher clearing point, an appropriate absolute value of dielectric anisotropy, a larger K value (Kr, $K_{33}$), an appropriate rotational viscosity, a shorter response time, a higher transmittance, a better contrast rate and a comparable, even better low-temperature storage stability.

EXAMPLE 2

The present Example provides a liquid crystal composition comprising components in the percentages by weight as shown in the table below, and the performance tests are carried out

| Code of component | Content | Test result of performance parameters | |
|---|---|---|---|
| 3CWO2 (N-2) | 17 | Δn | 0.099 |
| 3LCWO2 (II-2) | 8 | Cp | 72 |
| 4LCWO2 (II-2) | 8 | Δε | −3.6 |
| 5LCWO2 (II-2) | 8 | $K_{11}$ | 15.4 |
| 3CCV (M-1) | 21 | $K_{33}$ | 17.6 |
| 3CCV1 (M-1) | 12 | $\gamma_1$ | 67 |
| 1PP2V (M-4) | 8 | τ | 23 |
| 3PG'WO2 (III-2) | 2 | Tr | 15.7 |
| 4PG'WO2 (III-2) | 2 | CR | 1457 |
| 5PG'WO2 (III-2) | 2 | LTS(−40° C.) | 216 |
| 2OB(O)O1C(5, V) (I-1) | 6 | | |
| 3OB(O)O1C(5, V) (I-1) | 6 | | |

EXAMPLE 3

The present Example provides a liquid crystal composition comprising components in the percentages by weight as shown in the table below, and the performance tests are carried out

| Code of component | Content | Test result of performance parameters | |
|---|---|---|---|
| 3CWO2 (N-2) | 17 | Δn | 0.108 |
| 3CLWO2 (II-3) | 8 | Cp | 73 |
| 4CLWO2 (II-3) | 8 | Δε | −3.4 |
| 5CLWO2 (II-3) | 8 | $K_{11}$ | 15.2 |
| 3CCV (M-1) | 21 | $K_{33}$ | 17.2 |
| 3CCV1 (M-1) | 12 | $\gamma_1$ | 70 |
| 1PP2V (M-4) | 8 | τ | 23.8 |
| 3PWP2 (III-6) | 2 | Tr | 15.3 |
| 4PWP2 (III-6) | 2 | CR | 1414 |
| 5PWP2 (III-6) | 2 | LTS(−40° C.) | 168 |
| 2OB(S)O1C(5, V) (I-1) | 6 | | |
| 4OB(S)O1C(5, V) (I-1) | 6 | | |

EXAMPLE 4

The present Example provides a liquid crystal composition comprising components in the percentages by weight as shown in the table below, and the performance tests are carried out

| Code of component | Content | Test result performance parameters | |
|---|---|---|---|
| 3CWO2 (N-2) | 9 | Δn | 0.118 |
| 3CLWO2 (II-3) | 9 | Cp | 75 |
| 4CLWO2 (II-3) | 9 | Δε | −3.6 |
| 5CLWO2 (II-3) | 8 | $K_{11}$ | 16.3 |
| 3CCV (M-1) | 33 | $K_{33}$ | 18.8 |
| 1PP2V (M-4) | 8 | $\gamma_1$ | 72 |
| 2PPWO2 (III-1) | 2 | τ | 22.6 |
| 3PPWO2 (III-1) | 2 | Tr | 16.7 |
| 4PPWO2 (III-1) | 2 | CR | 1556 |
| 5PPWO2 (III-1) | 2 | LTS(−40° C.) | 144 |
| 2OB(S)O1C(5, V) (I-1) | 8 | | |
| 4OB(S)O1C(5, V) (I-1) | 8 | | |

EXAMPLE 5

The present Example provides a liquid crystal composition comprising components in the percentages by weight as shown in the table below, and the performance tests are carried out

| Code of component | Content | Test result of performance parameters | |
|---|---|---|---|
| 3CWO2 (N-2) | 15 | Δn | 0.11 |
| 3CPWO2 (N-16) | 9 | Cp | 75 |
| 3LCWO2 (II-2) | 5 | Δε | −3.7 |
| 4LCWO2 (II-2) | 5 | $K_{11}$ | 15.2 |
| 5LCWO2 (II-2) | 5 | $K_{33}$ | 17.2 |
| 3CCV (M-1) | 24 | $\gamma_1$ | 67 |
| 3CCV1 (M-1) | 12 | τ | 23.3 |
| 1PP2V (M-4) | 5 | Tr | 15.4 |
| 3PGWO2 (III-4) | 2 | CR | 1408 |
| 4PGWO2 (III-4) | 2 | LTS(−40° C.) | 168 |
| 5PGWO2 (III-4) | 2 | | |
| 1OB(S)O1C(5, V) (I-1) | 7 | | |
| 2OB(S)O1C(5, V) (I-1) | 7 | | |

EXAMPLE 6

The present Example provides a liquid crystal composition comprising components in the percentages by weight as shown in the table below, and the performance tests are carried out

| Code of component | Content | Test result of performance parameters | |
|---|---|---|---|
| 3CWO2 (N-2) | 11 | Δn | 0.111 |
| 2CLWO2 (II-3) | 8 | Cp | 85 |
| 3CLWO2 (II-3) | 8 | Δε | −3.6 |
| 4CLWO2 (II-3) | 8 | $K_{11}$ | 16.3 |
| 5CLWO2 (II-3) | 8 | $K_{33}$ | 18.6 |
| 3CCV (M-1) | 21 | $\gamma_1$ | 81 |
| 3CCV1 (M-1) | 12 | τ | 26.5 |
| 1PP2V (M-4) | 8 | Tr | 15.6 |
| 3PWWO2 (III-7) | 2 | CR | 1628 |
| 4PWWO2 (III-7) | 2 | LTS(−40° C.) | 168 |
| 2OB(S)O1C(5, V) (I-1) | 6 | | |
| 4OB(S)O1C(5, V) (I-1) | 6 | | |

EXAMPLE 7

The present Example provides a liquid crystal composition comprising components in the percentages by weight as shown in the table below, and the performance tests are carried out

| Code of component | Content | Test result of performance parameters | |
|---|---|---|---|
| 3CWO2 (N-2) | 19 | Δn | 0.115 |
| 3CLWO2 (II-3) | 8 | Cp | 70 |
| 4CLWO2 (II-3) | 8 | Δε | −3.5 |
| 5CLWO2 (II-3) | 4 | $K_{11}$ | 15 |
| 3CCV (M-1) | 21 | $K_{33}$ | 16.8 |
| 3CCV1 (M-1) | 12 | $\gamma_1$ | 65 |
| 1PP2V (M-4) | 8 | τ | 21.3 |
| 3PWP2 (III-6) | 3 | Tr | 15.7 |
| 4PWP2 (III-6) | 2 | CR | 1430 |
| 3G'G'WO2 (III-3) | 3 | LTS(−40° C.) | 168 |
| 4G'G'WO2 (III-3) | 2 | | |
| 2OB(S)O1C(5, V) (I-1) | 5 | | |
| 4OB(S)O1C(5, V) (I-1) | 5 | | |

EXAMPLE 8

The present Example provides a liquid crystal composition comprising components in the percentages by weight as shown in the table below, and the performance tests are carried out

| Code of component | Content | Test result of performance parameters | |
|---|---|---|---|
| 3C1OWO2 (N-5) | 5 | Δn | 0.12 |
| 3PWO2 (N-14) | 5 | Cp | 82 |
| 3OPWO2 (N-14) | 5 | Δε | −3.9 |
| 3CLWO2 (II-3) | 6 | $K_{11}$ | 16.1 |
| 4CLWO2 (II-3) | 6 | $K_{33}$ | 17.9 |
| 5CLWO2 (II-3) | 6 | $\gamma_1$ | 79 |
| 3CCV (M-1) | 29 | τ | 24.5 |
| 3CCV1 (M-1) | 12 | Tr | 15.7 |
| 1PGP2V (M-15) | 2 | CR | 1383 |
| 2GGWO2 (III-5) | 4 | LTS(−40° C.) | 120 |
| 3GGWO2 (III-5) | 4 | | |
| 4GGWO2 (III-5) | 4 | | |
| 2OB(O)O1C(5, V) (I-1) | 6 | | |
| 3OB(O)O1C(5, V) (I-1) | 6 | | |

EXAMPLE 9

The present Example provides a liquid crystal composition comprising components in the percentages by weight as shown in the table below, and the performance tests are carried out by filling the same into the two substrates of the liquid crystal display device:

| Code of component | Content | Test result of performance parameters | |
|---|---|---|---|
| 3CWO2 (N-2) | 5 | Δn | 0.112 |
| 3LWO2 (II-1) | 5 | Cp | 83 |
| 3OG'WO2 (N-27) | 6 | Δε | −3.9 |
| 3CLWO2 (II-3) | 4 | $K_{11}$ | 15.1 |
| 4CLWO2 (II-3) | 4 | $K_{33}$ | 17.7 |
| 5CLWO2 (II-3) | 4 | $\gamma_1$ | 77 |
| 3CC1OWO2 (N-10) | 6 | τ | 24.3 |
| 4CC1OWO2 (N-10) | 6 | Tr | 15.5 |
| 3CCV (M-1) | 26 | CR | 1390 |
| 5CCV1 (M-1) | 8 | LTS(−40° C.) | 168 |
| 1PP2V1 (M-4) | 4 | | |
| 3CPP2V1 (M-13) | 4 | | |
| 3PWPO2 (III-6) | 2 | | |
| 4PWPO2 (III-6) | 2 | | |
| 5PWPO2 (III-6) | 2 | | |
| 1OB(S)O1C(5, V) (I-1) | 6 | | |
| 2OB(S)O1C(5, V) (I-1) | 6 | | |

EXAMPLE 10

The present Example provides a liquid crystal composition comprising components in the percentages by weight as shown in the table below, and the performance tests are carried out

| Code of component | Content | Test result of performance parameters | |
|---|---|---|---|
| 3CWO2 (N-2) | 17 | Δn | 0.118 |
| 3CLWO2 (II-3) | 8 | Cp | 84 |
| 4CLWO2 (II-3) | 8 | Δε | −3.3 |
| 5CLWO2 (II-3) | 8 | $K_{11}$ | 15.2 |
| 3CCV (M-1) | 25 | $K_{33}$ | 16.9 |
| 3CCV1 (M-1) | 4 | $\gamma_1$ | 78 |
| V2CCP1 (M-11) | 4 | τ | 24.2 |
| 3CPP2V (M-13) | 2 | Tr | 15.2 |
| 3CPP2V1 (M-13) | 2 | CR | 1348 |
| 1PP2V (M-4) | 4 | LTS(−40° C.) | 216 |
| 3PPWO2 (III-1) | 3 | | |
| 3PGWO2 (III-4) | 3 | | |
| 3PG'WO2 (III-2) | 3 | | |
| 3PWP2 (III-6) | 3 | | |
| 2OB(S)O1C(5, V) (I-1) | 3 | | |
| 4OB(S)O1C(5, V) (I-1) | 3 | | |

EXAMPLE 11

The present Example provides a liquid crystal composition comprising components in the percentages by weight as shown in the table below, and the performance tests are carried out

| Code of component | Content | Test result of performance parameters | |
|---|---|---|---|
| 3CPO2 (M-2) | 5 | Δn | 0.121 |
| 3PPO2 (M-3) | 5 | Cp | 78 |
| 3LCWO2 (II-2) | 9 | Δε | −3.4 |
| 4LCWO2 (II-2) | 9 | $K_{11}$ | 16.6 |
| 5LCWO2 (II-2) | 8 | $K_{33}$ | 19.1 |
| 3CCV (M-1) | 33 | $\gamma_1$ | 78 |
| 1PP2V (M-4) | 7 | τ | 23.9 |
| V2PWPO2 (III-6) | 2 | Tr | 16.9 |

-continued

| Code of component | Content | Test result of performance parameters | |
|---|---|---|---|
| 1V2PWPO2 (III-6) | 2 | CR | 1476 |
| V2PGWO2 (III-4) | 2 | LTS(−40° C.) | 240 |
| 1V2PGWO2 (III-4) | 2 | | |
| 2OB(S)OV(2F) (B-1-4) | 4 | | |
| 4OB(S)OV(2F) (B-1-4) | 4 | | |
| 2OB(S)O1C(5, V) (I-1) | 4 | | |
| 4OB(S)O1C(5, V) (I-1) | 4 | | |

EXAMPLE 12

The present Example provides a liquid crystal composition comprising components in the percentages by weight as shown in the table below, and the performance tests are carried out by filling the same into the two substrates of the liquid crystal display device:

| Code of component | Content | Test result of performance parameters | |
|---|---|---|---|
| 3LWO2 (II-1) | 10 | Δn | 0.106 |
| 3OPWO2 (N-14) | 6 | Cp | 86 |
| 3CLWO2 (II-3) | 7 | Δε | −3.8 |
| 3LCWO2 (II-2) | 7 | $K_{11}$ | 15 |
| 3CC1OWO2 (N-10) | 10 | $K_{33}$ | 17.3 |
| 3CCV (M-1) | 26 | $\gamma_1$ | 80 |
| 3CCV1 (M-1) | 8 | τ | 24.5 |
| 1PP2V1 (M-4) | 4 | Tr | 15.4 |
| 3CCECC3 (M-28) | 4 | CR | 1428 |
| 3PG'WO2 (III-2) | 2 | LTS(−40° C.) | 192 |
| 4PG'WO2 (III-2) | 2 | | |
| 5PG'WO2 (III-2) | 2 | | |
| 1OB(S)O1C(5, V) (I-1) | 6 | | |
| 2OB(S)O4O1 (B-1-2) | 3 | | |
| 2OB(O)O1THF (B-4) | 3 | | |

In conclusion, the liquid crystal composition provided by the present invention has a better optical anisotropy, a better clearing point, an appropriate absolute value of dielectric anisotropy, a larger K value ($K_{11}$, $K_{33}$), a smaller rotational viscosity, a shorter response time, a higher transmittance, a higher contrast rate and a longer low-temperature storage time, which makes the liquid crystal display device containing the liquid crystal composition of the present invention have a wider using temperature range, a lower threshold voltage, a better contrast rate, a faster response speed, a faster refresh speed and a higher transmittance and suitable for VA, IPS, NFFS display modes and the like.

The applicant declares that the liquid crystal composition and liquid crystal display device of the present invention is illustrated by the above Examples, but the present invention is not limited to the above Examples, that is, it does not mean that the implement of the present application must rely on the above Examples. It shall be clear to the person skilled in the art that any improvements of the present invention, equivalent replacements of the raw materials used in the present invention, the additions of any auxiliary components, the selection of specific methods or the like all fall into the protection scope and the disclosure scope of the present invention.

INDUSTRIAL APPLICABILITY

The liquid crystal composition involved in the present invention can be applied to the liquid crystal field.

The invention claimed is:

1. A liquid crystal composition comprising at least one compound of general formula I-1, at least two compounds of general formula II and at least two compounds of general formula III:

I-1

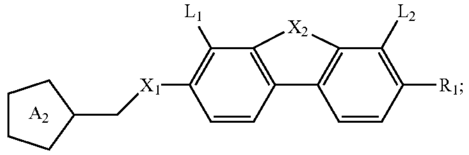

II

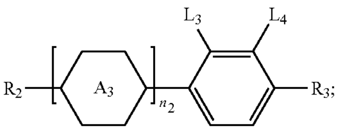

III

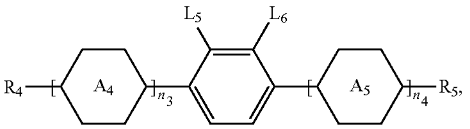

wherein, $R_1$ represents —H, $C_{1-12}$ halogenated or unhalogenated linear alkyl, $C_{3-12}$ halogenated or unhalogenated branched alkyl, $C_{1-12}$ halogenated or unhalogenated alkoxy, $C_{2-12}$ halogenated or unhalogenated alkenyl, $C_{2-12}$ halogenated or unhalogenated alkenoxy,

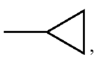, 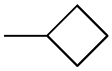 or 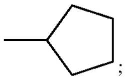;

$R_2$-$R_5$ each independently represents $C_{1-12}$ linear alkyl, $C_{3-12}$ branched alkyl, $C_{1-12}$ alkoxy, $C_{2-12}$ alkenyl, $C_{2-12}$ alkenoxy,

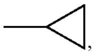, 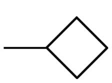 or 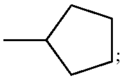;

ring 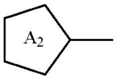 represents 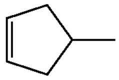;

ring 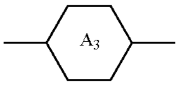 represents 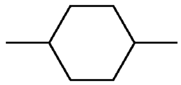, one or at least two —$CH_2$— in

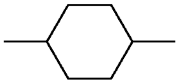

can be replaced by —O—, one or at least two single bond in the rings can be replaced by double bond, and one or at least two single bond in at least one ring

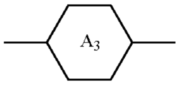

is replaced by double bond;

ring

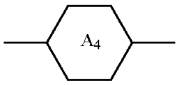 and ring 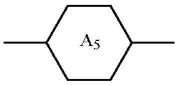

each independently represents

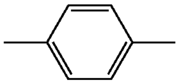, one or at least two —H on

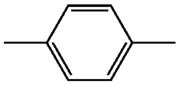

can each be independently replaced by —F, —Cl, —CN, —$CH_3$ or —$OCH_3$, one or at least two —CH═ in the rings can be replaced by —N═;

$L_1$-$L_6$ each independently represents halogen atom;

$X_1$ and $X_2$ each independently represents —O— or —S—;

$n_2$ represents 1 or 2, when $n_2$ represents 2, ring

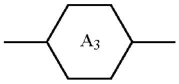

is the same or different; and $n_3$ represents 0, 1, 2 or 3, $n_4$ represents 0 or 1, and $2 \le n_3+n_4 \le 3$; when $n_3$ represents 2 or 3, ring

is the same or different;

in the liquid crystal composition, percentage by weight of the at least one compound of general formula I-1 is 1%-20%;

in the liquid crystal composition, percentage by weight of the at least two compounds of general formula II is 15%-36%;

in the liquid crystal composition, percentage by weight of the at least two compounds of general formula III is 3%-15%;

the liquid crystal composition further comprises at least one compound of general formula N:

N

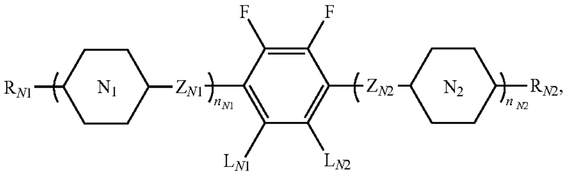

wherein, $R_{N1}$ and $R_{N2}$ each independently represents $C_{1-12}$ linear alkyl, $C_{3-12}$ branched alkyl,

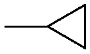, 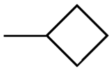 or 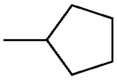, wherein one or at least two nonadjacent —$CH_2$— in the $C_{1-12}$ linear alkyl and $C_{3-12}$ branched alkyl can each be independently replaced by —CH═CH—, —C≡C—, —O—, —CO—, —CO—O— or —O—CO—;

ring

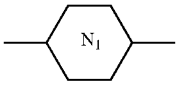 and ring 

each independently represents

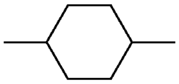 or , wherein one or at least two —$CH_2$— in

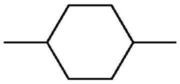

can be replaced by —O—; one or at least two —H on

can each be independently replaced by —F, —Cl or —CN, one or at least two —CH═ in the rings can be replaced by —N═;

$Z_{N1}$ and $Z_{N2}$ each independently represents single bond, —CO—O—, —O—CO—, —$CH_2O$—, —$OCH_2$—, —CH═CH—, —C≡C—, —$CH_2CH_2$—, —$CF_2CF_2$—, —$(CH_2)_4$—, —$CF_2O$— or —$OCF_2$—;

$L_{N1}$ and $L_{N2}$ each independently represents —H, $C_{1-3}$ alkyl, or halogen atom;

$n_{N1}$ represents 0, 1, 2 or 3, $n_{N2}$ represents 0 or 1, and $0 \le n_{N1}+n_{N2} \le 3$, wherein when $n_{N1}$ represents 2 or 3, ring

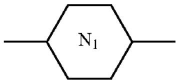

is the same or different, and $Z_{N1}$ is the same or different; and substituted or unsubstituted terphenyl structure is not contained in the compound of general formula N, the substituent for substitution is selected from —F, —Cl or —CN;

in the liquid crystal composition, percentage by weight of the at least one compound of general formula N is 5%-25%;

the liquid crystal composition further comprises at least one compound of general formula M:

M

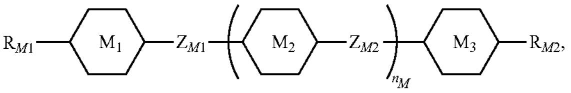

wherein, $R_{M1}$ and $R_{M2}$ each independently represents $C_{1-12}$ linear alkyl, $C_{3-12}$ branched alkyl,

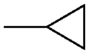, 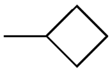 or 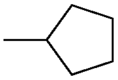, wherein one or at least two nonadjacent $—CH_2—$ in the $C_{1-12}$ linear alkyl and $C_{3-12}$ branched alkyl can each be independently replaced by —CH═CH—, —C≡C—, —O—, —CO—, —CO—O— or —O—CO—;

ring

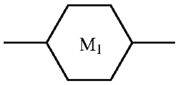, ring 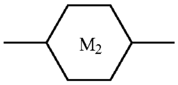 and ring

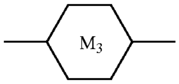

each independently represents

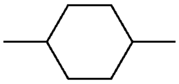 or .

wherein one or at least two $—CH_2—$ in

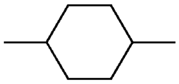

can be replaced by —O—, one or at least two single bond in the rings can be replaced by double bond; at most one —H on

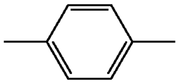

can be replaced by halogen atom;

$Z_{M1}$ and $Z_{M2}$ each independently represents single bond, —CO—O—, —O—CO—, $—CH_2O—$, $—OCH_2—$, —C≡C—, —CH═CH—, $—CH_2CH_2—$ or $—(CH_2)_4—$;

$n_M$ represents 0, 1 or 2, wherein when $n_M$ represents 2, ring

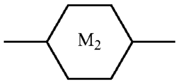

is the same or different, $Z_{M2}$ is the same or different;

in the liquid crystal composition, percentage by weight of the at least one compound of general formula M is 30%-50%.

2. The liquid crystal composition according to claim 1, wherein $L_1$ and $L_2$ represent fluorine atom.

3. The liquid crystal composition according to claim 1, wherein the liquid crystal composition comprises at least two compounds of general formula I-1.

4. The liquid crystal composition according to claim 1, wherein, in the liquid crystal composition, percentage by weight of the at least one compound of general formula I-1 is 4%-16%.

5. The liquid crystal composition according to claim 1, wherein the at least two compounds of general formula II are selected from the group consisting of:

II-1

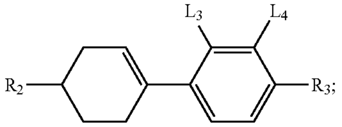

II-2

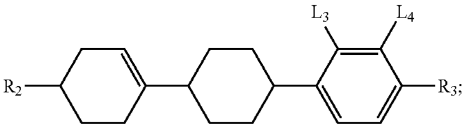

II-3

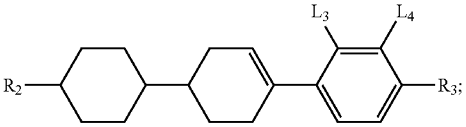

II-4

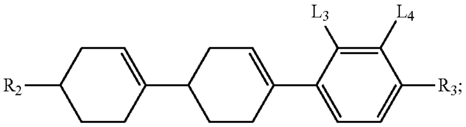

II-5

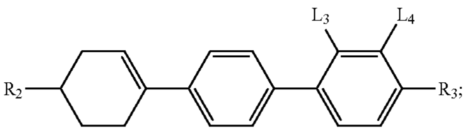 and

-continued

II-6

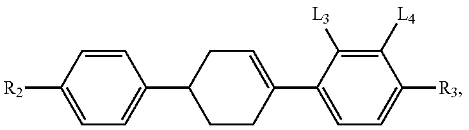

wherein $R_2$ and $R_3$ each independently represents $C_{1-12}$ linear alkyl, $C_{3-12}$ branched alkyl, $C_{1-12}$ alkoxy, $C_{2-12}$ alkenyl, $C_{2-12}$ alkenoxy,

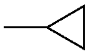, 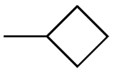 or 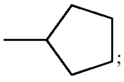;

and wherein $L_3$ and $L_4$ each independently represents halogen atom.

6. The liquid crystal composition according to claim 1, wherein $L_3$ and $L_4$ both represent fluorine atom.

7. The liquid crystal composition according to claim 1, wherein the at least two compounds of general formula III are selected from the group consisting of:

III-1

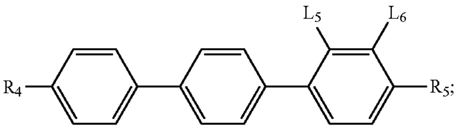

III-2

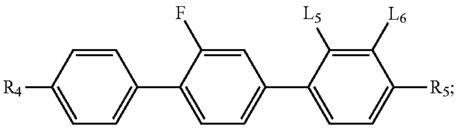

III-3

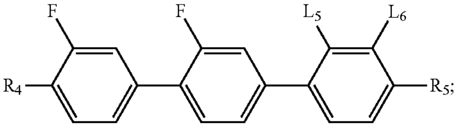

III-4

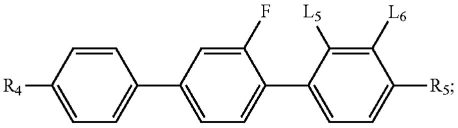

III-5

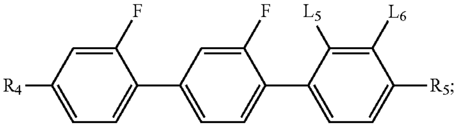

III-6

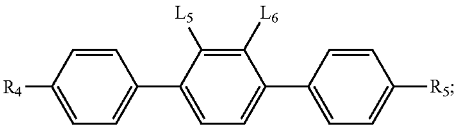

-continued

III-7

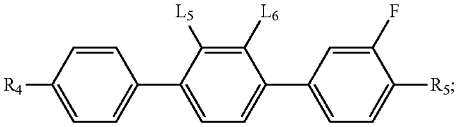

III-8

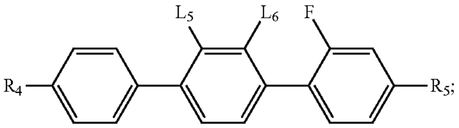

III-9

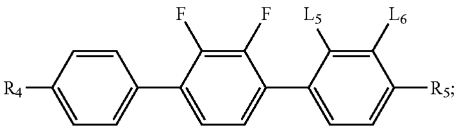

III-10

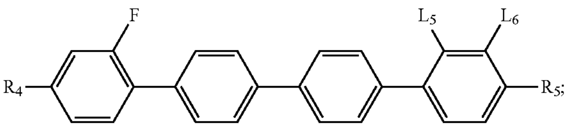

III-11

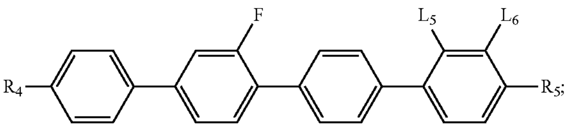

III-12

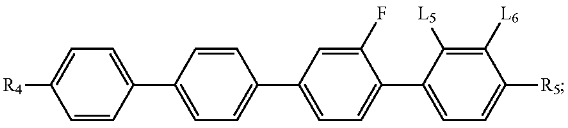

III-13

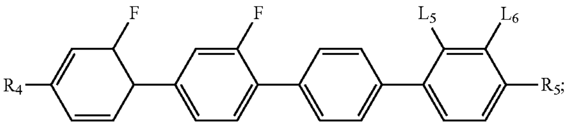

III-14

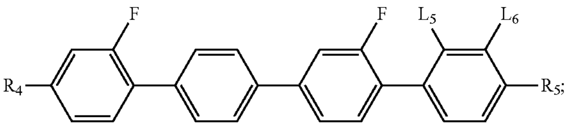

III-15

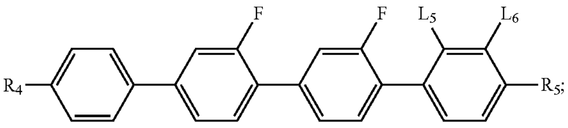

III-16

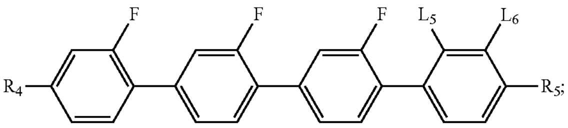

-continued

III-17

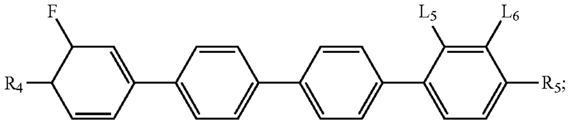

III-18

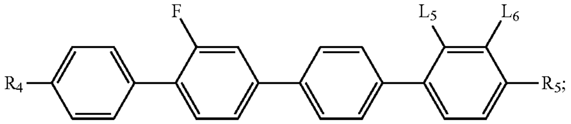

III-19

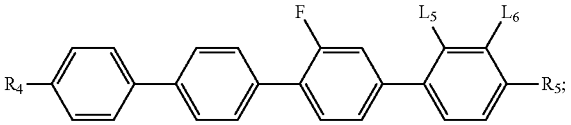

III-20

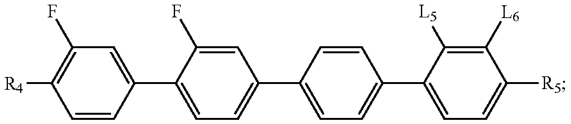

III-21

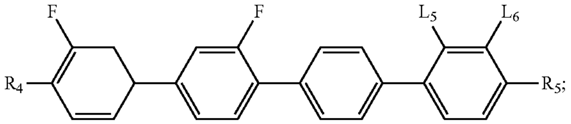

III-22

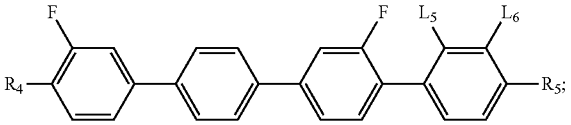

III-23

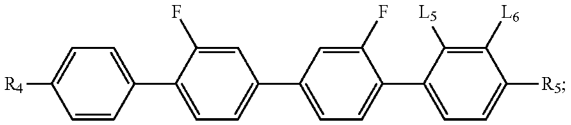

III-24

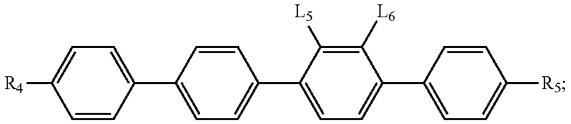

III-25

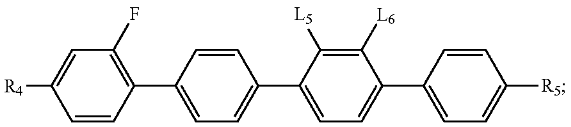

III-26

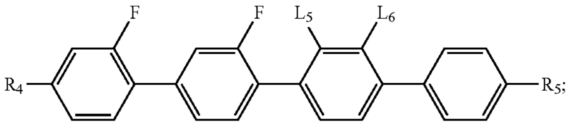

-continued

III-27

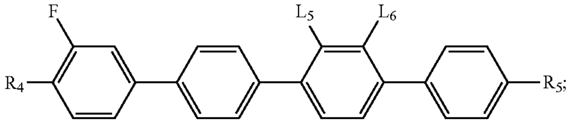

III-28

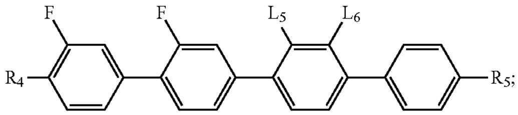

and

III-29

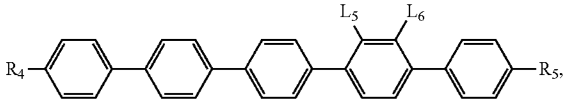

wherein $R_4$ and $R_5$ each independently represents $C_{1-12}$ linear alkyl, $C_{3-12}$ branched alkyl, $C_{1-12}$ alkoxy, $C_{2-12}$ alkenyl, $C_{2-12}$ alkenoxy,

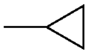,
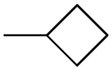
or
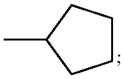;

and wherein $L_5$ and $L_6$ each independently represents halogen atom.

8. The liquid crystal composition according to claim 1, wherein $L_5$ and $L_6$ both represent fluorine atom.

9. The liquid crystal composition according to claim 1, wherein the at least one compound of general formula N is selected from the group consisting of:

N-1
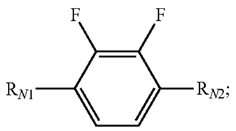
N-2
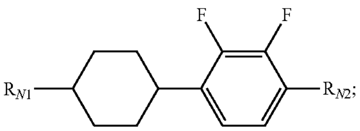
N-3
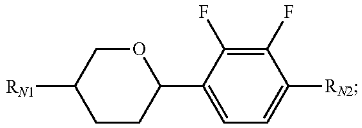
N-4
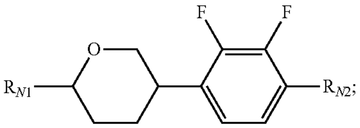
N-5
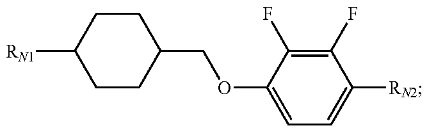
N-6
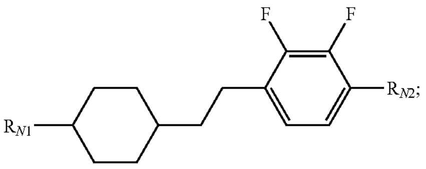
N-7
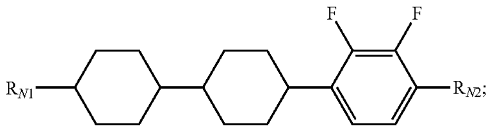
N-8
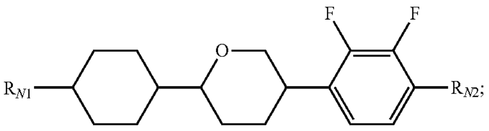
N-9
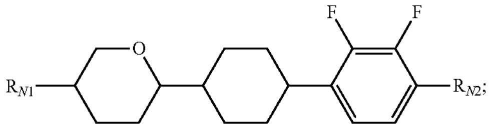
N-10
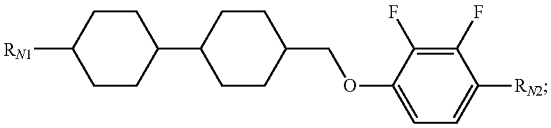
N-11
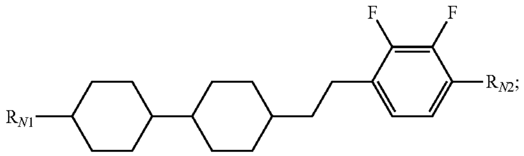
N-12
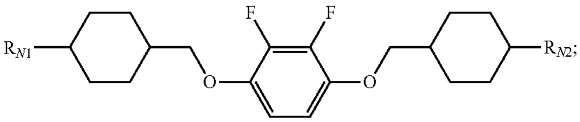
N-13
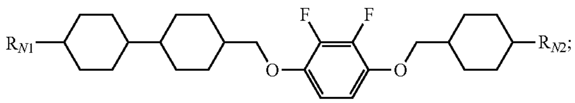
N-14
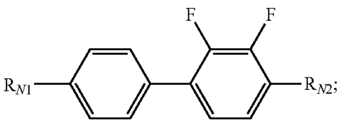
N-15
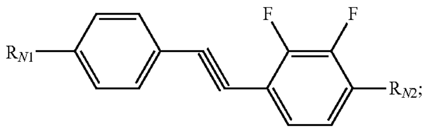
N-16
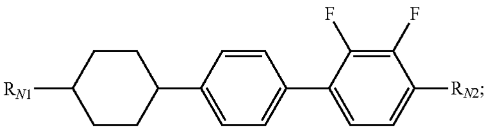
N-17
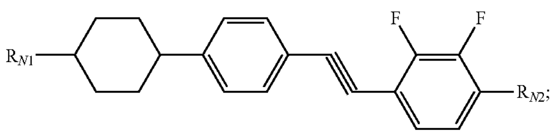
N-18
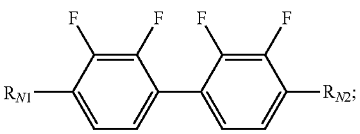
N-19
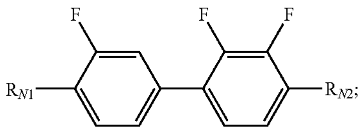
N-20
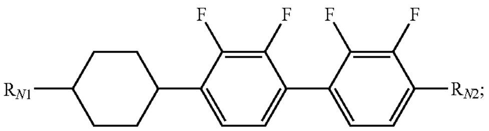

-continued

N-21

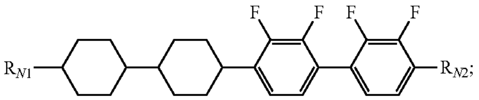

N-22

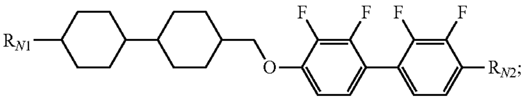

and

N-23

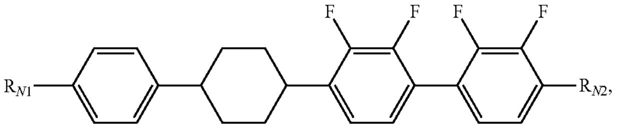

wherein, $R_{N1}$ and $R_{N2}$ each independently represents $C_{1-2}$ linear alkyl, $C_{3-12}$ branched alkyl,

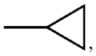, 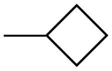 or 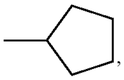, wherein one or at least two nonadjacent $—CH_2—$ in the $C_{1-12}$ linear alkyl and $C_{3-12}$ branched alkyl can each be independently replaced by —CH═CH—, —C≡C—, —O—, —CO—, —CO—O— or —O—CO—.

10. The liquid crystal composition according to claim 9, wherein the at least one compound of general formula N is selected from the group consisting of:

N-2

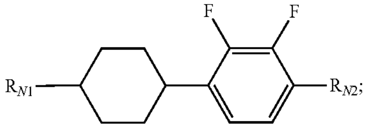

N-5

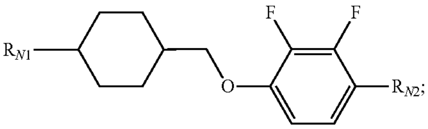

N-7

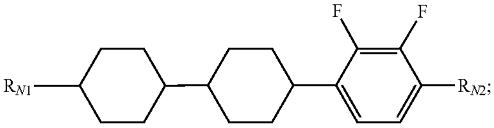

N-10

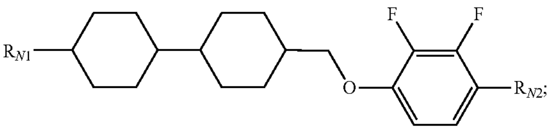

N-14

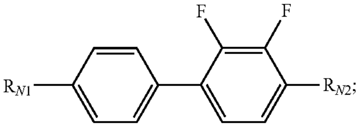

N-16

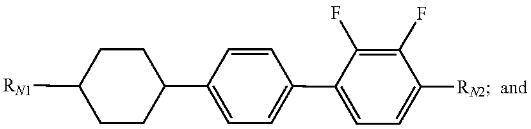

and

-continued

N-19

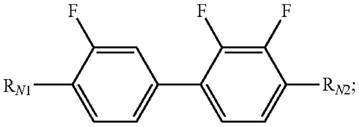

wherein, $R_{N1}$ and $R_{N2}$ each independently represents $C_{1-12}$ linear alkyl, $C_{3-12}$ branched alkyl,

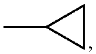, 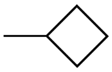 or 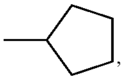, wherein one or at least two nonadjacent $—CH_2—$ in the $C_{1-12}$ linear alkyl and $C_{3-12}$ branched alkyl can each be independently replaced by —CH═CH—, —C≡C—, —O—, —CO—, —CO—O— or —O—CO—.

11. The liquid crystal composition according to claim 1, wherein the at least one compound of general formula M is selected from the group consisting of:

M-1

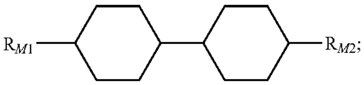

M-2

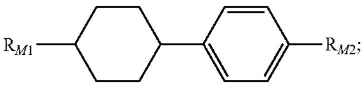

M-3

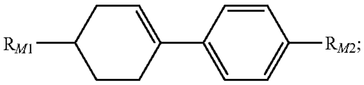

M-4

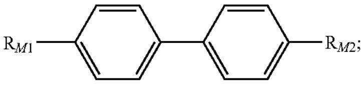

M-5

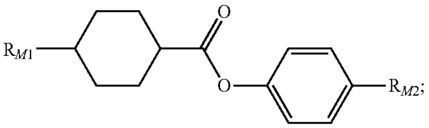

-continued
M-6
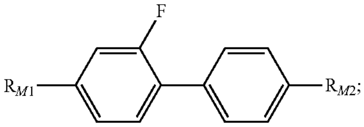
M-7
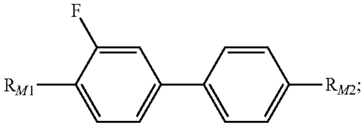
M-8
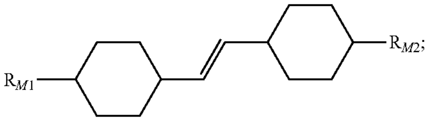
M-9
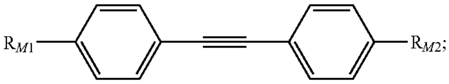
M-10
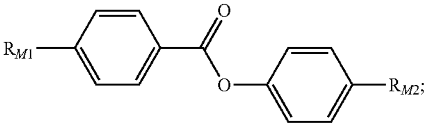
M-11
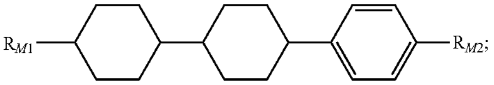
M-12
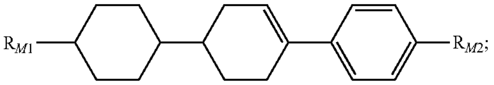
M-13
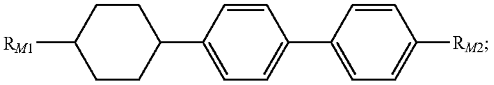
M-14
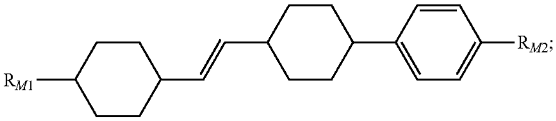
M-15
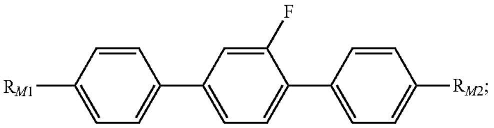
M-16
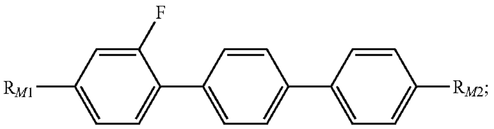
M-17
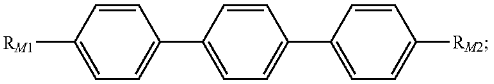
-continued
M-18
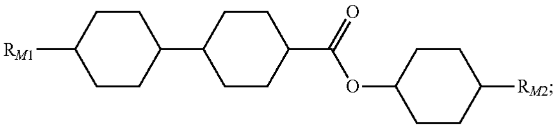
M-19
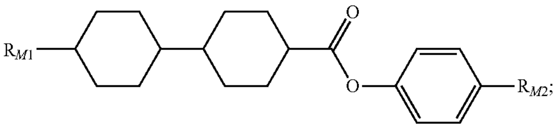
M-20
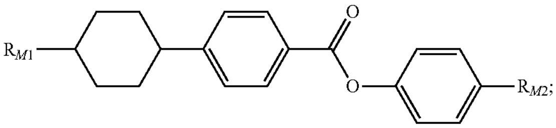
M-21
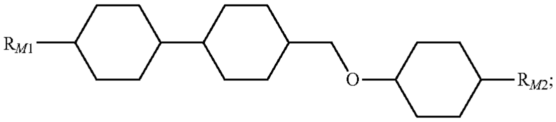
M-22
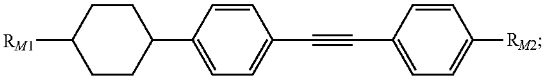
M-23
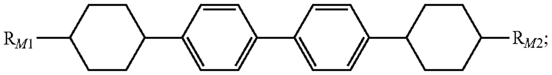
M-24
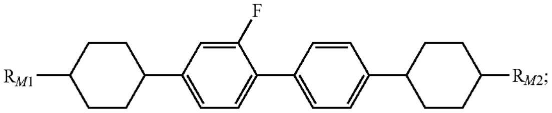
M-25
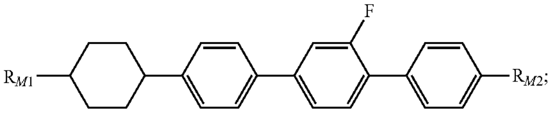
M-26
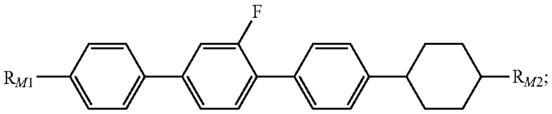
M-27
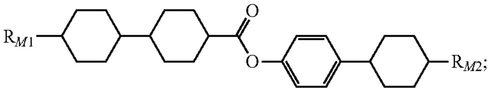
and
M-28
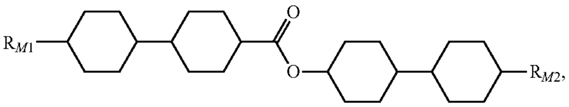
wherein, $R_{M1}$ and $R_{M2}$ each independently represents $C_{1-12}$ linear alkyl, $C_{3-12}$ branched alkyl,

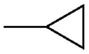, 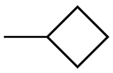 or 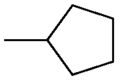, wherein one or at least two nonadjacent —$CH_2$— in the $C_{1-12}$ linear alkyl and $C_{3-12}$ branched alkyl can each be independently replaced by —CH═CH—, —C≡C—, —O—, —CO—, —CO—O— or —O—CO—.

12. The liquid crystal composition according to claim 11, wherein the at least one compound of general formula M is selected from the group consisting of:

M-1

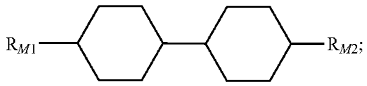

M-2

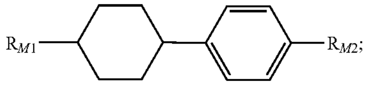

M-4

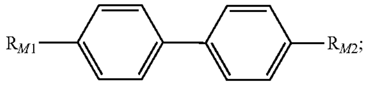

M-13

M-15

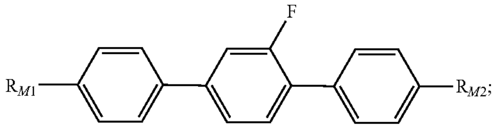 and

M-28

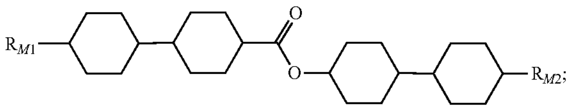

wherein, $R_{M1}$ and $R_{M2}$ each independently represents $C_{1-12}$ linear alkyl, $C_{3-12}$ branched alkyl,

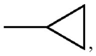, 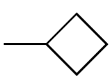 or 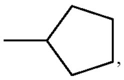, wherein one or at least two nonadjacent —$CH_2$— in the $C_{1-12}$ linear alkyl and $C_{3-12}$ branched alkyl can each be independently replaced by —CH═CH—, —C≡C—, —O—, —CO—, —CO—O— or —O—CO—.

13. The liquid crystal composition according to claim 1, wherein the liquid crystal composition further comprises at least one compound of general formula B:

B

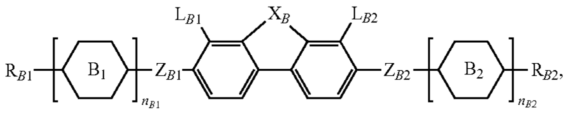

wherein:

$R_{B1}$ and $R_{B2}$ each independently represents halogen atom, $C_{1-12}$ halogenated or unhalogenated linear alkyl, $C_{3-12}$ halogenated or unhalogenated branched alkyl,

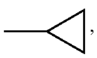, 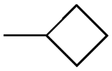 or 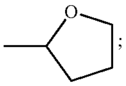;

wherein one or at least two nonadjacent —$CH_2$— in the $C_{1-12}$ halogenated or unhalogenated linear alkyl, $C_{3-12}$ halogenated or unhalogenated branched alkyl,

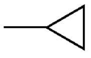 or 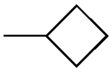

can each independently be replaced by —CH═CH—, —C≡C—, —CH═CF—, —O—, —CO—, —CO—O— or —O—CO—;

ring

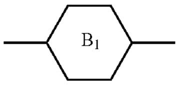 and ring 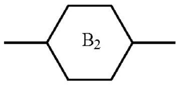

each independently represents

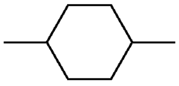, 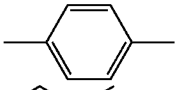 or

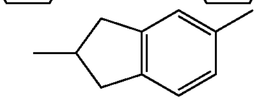, wherein one or at least two nonadjacent —$CH_2$— in

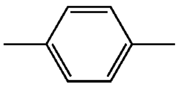 and

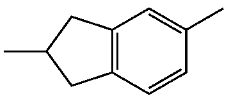

can be replaced by —O—, one or at least two single bond in the rings can be replaced by double bond; one or at least two —H on

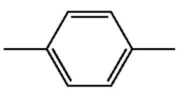

and

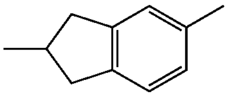

can each be independently replaced by —CN, —F or —Cl, one or at least two —CH═ in the rings can be replaced by —N═;

$X_B$ represents —O—, —S— or —CO—;

$L_{B1}$ and $L_{B2}$ each independently represents —H, —F, —Cl, —$CF_3$ or —$OCF_3$;

$Z_{B1}$ and $Z_{B2}$ each independently represents single bond, —CO—O—, —O—CO—, —$CH_2O$—, —$OCH_2$—, —CH═CH—, —C≡C—, —$CH_2CH_2$—, —$CF_2CF_2$—, —$(CH_2)n_{B4}$-, —$(CH_2)n_{B4}O$—, —$(CH_2)n_{B4}S$—, —$CF_2O$— or —$OCF_2$—, wherein $n_{B4}$ represents an integer of 0-5; and $n_{B1}$ and $n_{B2}$ each independently represents 0, 1 or 2, wherein when $n_{B1}$ represents 2, ring

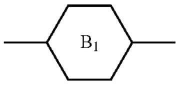

is the same or different, when $n_{B2}$ represents 2, ring

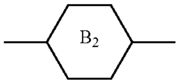

is the same or different, $Z_{B2}$ is the same or different.

14. The liquid crystal composition according to claim 13, wherein the at least one compound of general formula B is selected from the group consisting of:

B-1

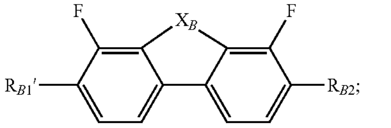

B-2

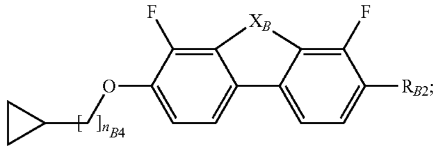

B-3

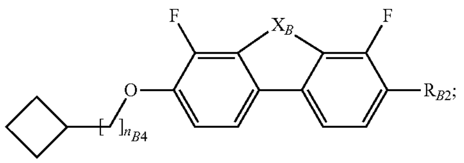

B-4

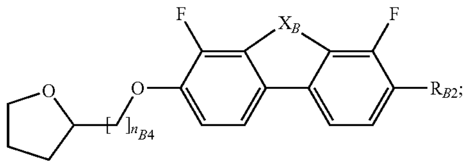

-continued

B-5

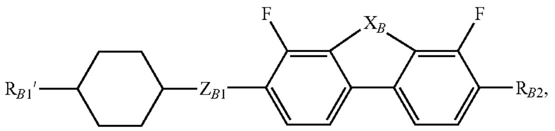

B-6

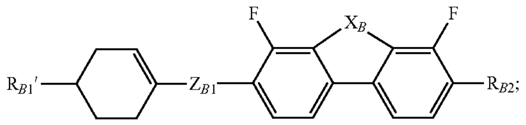

and

B-7

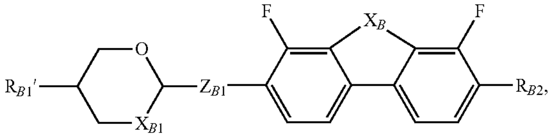

wherein:

$R_{B1}'$ represents $C_{1-8}$ alkyl, $C_{1-8}$ alkoxy, $C_{2-8}$ alkenyl;

$X_{B1}$ represents —O— or —$CH_2$—;

$R_{B2}$ represents halogen atom, $C_{1-12}$ halogenated or unhalogenated linear alkyl, $C_{3-12}$ halogenated or unhalogenated branched alkyl,

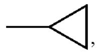,

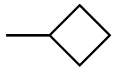

or

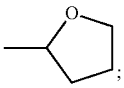;

wherein one or at least two nonadjacent —$CH_2$— in the $C_{1-12}$ halogenated or unhalogenated linear alkyl, $C_{3-12}$ halogenated or unhalogenated branched alkyl,

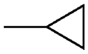

or

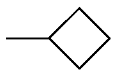

can each independently be replaced by —CH═CH—, —C≡C—, —CH═CF—, —O—, —CO—, —CO—O— or —O—CO—;

$X_B$ represents —O—, —S— or —CO—;

$Z_{B1}$ represents single bond, —CO—O—, —O—CO—, —$CH_2O$—, —$OCH_2$—, —CH═CH—, —C≡C—, —$CH_2CH_2$—, —$CF_2CF_2$—, —$(CH_2)n_{B4}$-, —$(CH_2)n_{B4}O$—, —$(CH_2)n_{B4}S$—, —$CF_2O$— or —$OCF_2$—; and $n_{B4}$ represents an integer of 0-5.

15. The liquid crystal composition according to claim 14, wherein the at least one compound of general formula B-1 is selected from the group consisting of:

B-1-1

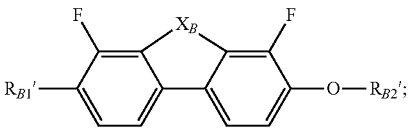

B-1-2

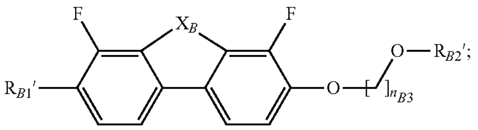

B-1-3

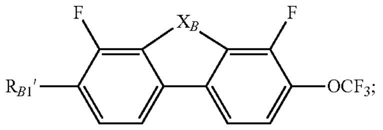

and

-continued

B-1-4

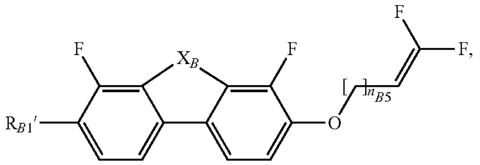

wherein:

$R_{B2}$' represents $C_{1-8}$ alkyl;

$R_{B1}$' represents $C_{1-8}$ alkyl, $C_{1-8}$ alkoxy or $C_{2-8}$ alkenyl;

$X_B$ represents —O—, —S— or —CO—;

$n_{B3}$ represents 1, 2, 3 or 4; and $n_{B5}$ represents 0, 1, 2, 3 or 4.

16. The liquid crystal composition according to claim 13, wherein, in the liquid crystal composition, percentage by weight of the at least one compound of general formula B is 1%-10%.

17. A liquid crystal display device, wherein the liquid crystal display device comprises the liquid crystal composition of claim 1.

* * * * *